(12) United States Patent
Wu et al.

(10) Patent No.: US 11,102,839 B2
(45) Date of Patent: Aug. 24, 2021

(54) UNICAST SIDELINK ESTABLISHMENT

(71) Applicant: QUALCOMM Incorporated, San Diego, CA (US)

(72) Inventors: Zhibin Wu, Sunnyvale, CA (US); Hong Cheng, Bridgewater, NJ (US); Sudhir Kumar Baghel, Hillsborough, NJ (US); Shailesh Patil, San Diego, CA (US); Kapil Gulati, Hillsborough, NJ (US); Arjun Bharadwaj, Poway, CA (US); Tien Viet Nguyen, Bridgewater, NJ (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 16/665,555

(22) Filed: Oct. 28, 2019

(65) Prior Publication Data

US 2020/0146094 A1    May 7, 2020

Related U.S. Application Data

(60) Provisional application No. 62/755,292, filed on Nov. 2, 2018.

(51) Int. Cl.
*H04W 76/27* (2018.01)
*H04W 80/08* (2009.01)
(Continued)

(52) U.S. Cl.
CPC .......... *H04W 76/27* (2018.02); *H04W 4/40* (2018.02); *H04W 80/02* (2013.01); *H04W 80/08* (2013.01); *H04W 92/18* (2013.01)

(58) Field of Classification Search
CPC ....... H04W 76/27; H04W 80/08; H04W 4/40; H04W 80/02; H04W 92/18; H04W 76/14; H04W 4/46; H04W 4/90; H04W 4/70; H04W 4/06
See application file for complete search history.

(56) References Cited

U.S. PATENT DOCUMENTS

2019/0349730 A1    11/2019  Kim et al.
2020/0267790 A1*   8/2020   Kim ................. H04W 76/14

FOREIGN PATENT DOCUMENTS

GB         2548374 A         9/2017
WO    WO-2013162193 A1     10/2013
WO    WO-2017099833 A1      6/2017

OTHER PUBLICATIONS

CATT: "Discussion on Unicast Connection Setup Procedure", 3GPP TSG-RAN WG2 Meeting #107, 3GPP Draft; R2-1908737, 3rd Generation Partnership Project (3GPP), Mobile Competence Centre, 650, Route Des Lucioles, F-06921 Sophia-Antipolis Cedex, France, vol. RAN WG2. No. Prague, Czech Republic; Aug. 26, 2019-Aug. 30, 2019, Aug. 16, 2019 (Aug. 16, 2019), 9 Pages, XP051766559, Retrieved from the Internet: URL: http://www.3gpp.org/ftp/tsg_ran/WG2_RL2/TSGR2_107/Docs/R2-1908737.zip, [retrieved on Aug. 16, 2019], Sections 1.-4., Appendices A, B.
(Continued)

*Primary Examiner* — Diane D Mizrahi
(74) *Attorney, Agent, or Firm* — Holland & Hart LLP

(57) ABSTRACT

Methods, systems, and devices for wireless communications are described. A first user equipment (UE) may establish a unicast connection over a sidelink communications with a second UE. To establish the unicast connection over the sidelink, the first UE may transmit a request message (e.g., a first message) to the second UE, and the second UE may transmit a response message (e.g., a second message) to the first UE accepting the request. The unicast connection over the sidelink may then be established between the first UE and the second UE, and user data may then be transmitted over the sidelink on the established unicast connection. Additionally, the first UE may transmit a connection complete message (e.g., a third message) to the second UE
(Continued)

indicating that the unicast connection has been established. The request message, the response message, and the connection complete message may be radio resource control (RRC) messages.

30 Claims, 14 Drawing Sheets

(51) Int. Cl.
*H04W 4/40* (2018.01)
*H04W 80/02* (2009.01)
*H04W 92/18* (2009.01)

(56) References Cited

OTHER PUBLICATIONS

International Search Report and Written Opinion—PCT/US2019/058462—ISA/EPO—dated Jan. 16, 2020.
Vivo: "Consideration on PC5 L3 Protocol Design", 3GPP TSG-RAN WG2 Meeting #103bis, 3GPP Draft; R2-1813923 Consideration on PC5 L3 Protocol Design, 3rd Generation Partnership Project (3GPP), Mobile Competence Centre, 650, Route Des Lucioles ; F-06921 Sophia-Antipolis Cedex, France, vol. RAN WG2, No. Chengdu, CN; Oct. 8, 2018-Oct. 12, 2018, Sep. 28, 2018 (Sep. 28, 2018), 3 Pages, XP051523393, Retrieved from the Internet: URL: http://www.3gpp.org/ftp/tsg%5Fran/WG2%5FRL2/TSGR2%5F103bis/Docs/R2%2D1813923%2Ezip [retrieved on Sep. 28, 2018], Sections 1.-3.

\* cited by examiner

UNICAST SIDELINK ESTABLISHMENT

CROSS REFERENCE

The present application for patent claims the benefit of U.S. Provisional Patent Application No. 62/755,292 by WU, et al., entitled "UNICAST SIDELINK ESTABLISHMENT," filed Nov. 2, 2018, assigned to the assignee hereof, and which is expressly incorporated by reference herein.

BACKGROUND

The following relates generally to wireless communications, and more specifically to unicast sidelink establishment.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, communications may occur between vehicles and systems that use such wireless communications. Accordingly, these systems may sometimes be referred to as vehicle-to-anything (V2X) communication systems. V2X communication links may convey important information to or from vehicles, for example, regarding inclement weather, nearby accidents, road conditions, and/or the activities of nearby vehicles. V2X communication systems may also be used by autonomous or semi-autonomous vehicles (e.g., self-driving vehicles or vehicles that provide driver assistance) and may provide extra information beyond the reach of the vehicle's existing system. Such V2X communications links may provide certain safety-related information (e.g., location, direction of travel, velocity, etc.) in unencrypted messages so that other vehicles may receive such information. However, these unencrypted messages may impact security protections of one or more of the vehicles and may also include different characteristics that impact resource allocations for the unencrypted message transmissions. Accordingly, efficient techniques for V2X communication links may be desirable.

SUMMARY

The described techniques relate to improved methods, systems, devices, and apparatuses that support unicast sidelink establishment. Generally, the described techniques provide for a first user equipment (UE) (e.g., an initiating UE) to establish a unicast connection over sidelink communications with a second UE (e.g., a target UE). To establish the unicast connection over the sidelink, the first UE may first transmit a request message (e.g., a first message) to the second UE. In some cases, this request message may include a set of parameters for the first UE, such as transmit or receive capabilities of the first UE. The second UE may then transmit a response message (e.g., a second message) to the first UE accepting the request. In some cases, response message may include a set of parameters for the second UE, such as transmit or receive capabilities of the second UE. Based on the acceptance of the request and the set of parameters for the second UE, the unicast connection over the sidelink may be established between the first UE and the second UE, and user data may then be transmitted between the first UE and the second UE over the sidelink on the established unicast connection. Additionally, the first UE may transmit a connection complete message (e.g., a third message) to the second UE indicating that the unicast connection has been established, and a security context may be established between the first UE and the second UE to support secure communications.

In some cases, the second UE may include a set of parameters for the second UE in the response message based on receiving the set of parameters for the first UE in the request message. The parameters for one or both of the UEs may enable or support the unicast connection establishment, where the parameters include information for setting a packet data convergence protocol (PDCP) context, a radio link control (RLC) context, a medium access control (MAC) context, a physical (PHY) layer context, or a combination thereof for the unicast connection. Additionally, each of the request message, the response message, and the connection complete message may be transmitted over a radio resource control (RRC) layer between the first UE and the second UE and, as such, may be RRC messages. In some cases, the unicast connection over the sidelink may be implemented in a vehicle-to-anything (V2X) communications system.

A method of wireless communications at a first UE (e.g., an initiating UE) is described. The method may include transmitting, to a second UE (e.g., a target UE), a first RRC message (e.g., a request message) including a request to establish a unicast connection over a sidelink between the first UE and the second UE, receiving, from the second UE, a second RRC message (e.g., a response message) indicating an acceptance of the request to establish the unicast connection over the sidelink and a set of parameters of the second UE, establishing the unicast connection over the sidelink with the second UE based on the acceptance of the request and the set of parameters of the second UE, and transmitting or receiving user data over the sidelink using the established unicast connection.

An apparatus for wireless communications at a first UE is described. The apparatus may include a processor, memory in electronic communication with the processor, and instructions stored in the memory. The instructions may be executable by the processor to cause the apparatus to transmit, to a second UE, a first RRC message including a request to establish a unicast connection over a sidelink between the first UE and the second UE, receive, from the second UE, a second RRC message indicating an acceptance of the request to establish the unicast connection over the sidelink and a set of parameters of the second UE, establish the unicast connection over the sidelink with the second UE based on the acceptance of the request and the set of parameters of the second UE, and transmit or receiving user data over the sidelink using the established unicast connection.

Another apparatus for wireless communications at a first UE is described. The apparatus may include means for transmitting, to a second UE, a first RRC message including a request to establish a unicast connection over a sidelink between the first UE and the second UE, receiving, from the second UE, a second RRC message indicating an acceptance of the request to establish the unicast connection over the sidelink and a set of parameters of the second UE, establishing the unicast connection over the sidelink with the second UE based on the acceptance of the request and the set of parameters of the second UE, and transmitting or receiving user data over the sidelink using the established unicast connection.

A non-transitory computer-readable medium storing code for wireless communications at a first UE is described. The code may include instructions executable by a processor to transmit, to a second UE, a first RRC message including a request to establish a unicast connection over a sidelink between the first UE and the second UE, receive, from the second UE, a second RRC message indicating an acceptance of the request to establish the unicast connection over the sidelink and a set of parameters of the second UE, establish the unicast connection over the sidelink with the second UE based on the acceptance of the request and the set of parameters of the second UE, and transmit or receiving user data over the sidelink using the established unicast connection.

In some examples of the method, apparatuses, and non-transitory computer-readable medium described herein, establishing the unicast connection over the sidelink with the second UE further may include operations, features, means, or instructions for transmitting, to the second UE, a third RRC message (e.g., connection complete message) indicating that the unicast connection has been established.

In some examples of the method, apparatuses, and non-transitory computer-readable medium described herein, establishing the unicast connection may include operations, features, means, or instructions for establishing a security context for the unicast connection based on the set of parameters of the second UE.

In some examples of the method, apparatuses, and non-transitory computer-readable medium described herein, one or more of the first RRC message or the second RRC message may include one or more PDCP parameters, and establishing the unicast connection over the sidelink with the second UE may include operations, features, means, or instructions for setting a PDCP context of the unicast connection based on the one or more PDCP parameters.

In some examples of the method, apparatuses, and non-transitory computer-readable medium described herein, one or more of the first RRC message or the second RRC message may include one or more RLC parameters, and establishing the unicast connection over the sidelink with the second UE may include operations, features, means, or instructions for setting an RLC context of the unicast connection based on the one or more RLC parameters.

In some examples of the method, apparatuses, and non-transitory computer-readable medium described herein, the one or more RLC parameters may include an indication of whether an acknowledged mode or an unacknowledged mode may be supported by the first UE or the second UE.

In some examples of the method, apparatuses, and non-transitory computer-readable medium described herein, one or more of the first RRC message or the second RRC message may include one or more MAC layer parameters, and establishing the unicast connection over the sidelink with the second UE may include operations, features, means, or instructions for setting a MAC context of the unicast connection based on the one or more MAC layer parameters.

In some examples of the method, apparatuses, and non-transitory computer-readable medium described herein, the one or more MAC layer parameters may include an indication of a resource selection algorithm for the first UE or the second UE, an acknowledgment parameter for the first UE or the second UE, a carrier aggregation parameter for the first UE or the second UE, or a combination thereof.

In some examples of the method, apparatuses, and non-transitory computer-readable medium described herein, one or more of the first RRC message or the second RRC message may include one or more PHY layer parameters, and establishing the unicast connection over the sidelink with the second UE may include operations, features, means, or instructions for setting a PHY layer context of the unicast connection based on the one or more PHY layer parameters.

In some examples of the method, apparatuses, and non-transitory computer-readable medium described herein, the one or more PHY layer parameters may include a transmit format for the unicast connection, a radio resource configuration for the unicast connection, a supported band for the unicast connection, or a combination thereof.

In some examples of the method, apparatuses, and non-transitory computer-readable medium described herein, establishing the unicast connection over the sidelink with the second UE may include operations, features, means, or instructions for negotiating internet protocol (IP) layer parameters for the unicast connection with the second UE via upper layer messaging carried in the first RRC message or the second RRC message.

Some examples of the method, apparatuses, and non-transitory computer-readable medium described herein may further include operations, features, means, or instructions for transmitting a keep alive message to the second UE for the unicast connection.

In some examples of the method, apparatuses, and non-transitory computer-readable medium described herein, the keep alive message may be transmitted periodically.

In some examples of the method, apparatuses, and non-transitory computer-readable medium described herein, the keep alive message may be transmitted on-demand in response to a trigger.

In some examples of the method, apparatuses, and non-transitory computer-readable medium described herein, the keep alive message may be one or more of a fourth RRC message or a MAC control element (MAC CE) message.

Some examples of the method, apparatuses, and non-transitory computer-readable medium described herein may further include operations, features, means, or instructions for initiating a release procedure to end the unicast connection with the second UE.

In some examples of the method, apparatuses, and non-transitory computer-readable medium described herein, establishing the unicast connection over the sidelink with the second UE may include operations, features, means, or instructions for setting up a bearer for the unicast connection and filtering data to and from the bearer based on a layer 2 identifier of the first UE, a layer 2 identifier of the second UE, and a quality of service (QoS) profile of the unicast connection.

In some examples of the method, apparatuses, and non-transitory computer-readable medium described herein, the filtering occurs at a V2X layer.

In some examples of the method, apparatuses, and non-transitory computer-readable medium described herein, the first and second RRC messages may be carried by one or more sidelink signaling radio bearers.

Some examples of the method, apparatuses, and non-transitory computer-readable medium described herein may further include operations, features, means, or instructions for receiving an indication of a service offered by the second UE, where the first UE transmits the first RRC message based on the indication of the service.

In some examples of the method, apparatuses, and non-transitory computer-readable medium described herein, the set of parameters may include a set of capabilities, connection parameters, or a combination thereof for the second UE.

In some examples of the method, apparatuses, and non-transitory computer-readable medium described herein, the first RRC message may include a first set of parameters of the first UE, where the set of parameters of the second UE is based on the first set of parameters of the first UE.

A method of wireless communications at a second UE (e.g., a target UE) is described. The method may include receiving, from a first UE (e.g., an initiating UE), a first RRC message (e.g., a request message) including a request to establish a unicast connection over a sidelink between the first UE and the second UE, transmitting, to the first UE, a second RRC message (e.g., a response message) indicating an acceptance of the request to establish the unicast connection over the sidelink and a set of parameters of the second UE, establishing the unicast connection over the sidelink with the first UE based on the acceptance of the request and the set of parameters of the second UE, and transmitting or receiving user data over the sidelink using the established unicast connection.

An apparatus for wireless communications at a second UE is described. The apparatus may include a processor, memory in electronic communication with the processor, and instructions stored in the memory. The instructions may be executable by the processor to cause the apparatus to receive, from a first UE, a first RRC message including a request to establish a unicast connection over a sidelink between the first UE and the second UE, transmit, to the first UE, a second RRC message indicating an acceptance of the request to establish the unicast connection over the sidelink and a set of parameters of the second UE, establish the unicast connection over the sidelink with the first UE based on the acceptance of the request and the set of parameters of the second UE, and transmit or receiving user data over the sidelink using the established unicast connection.

Another apparatus for wireless communications at a second UE is described. The apparatus may include means for receiving, from a first UE, a first RRC message including a request to establish a unicast connection over a sidelink between the first UE and the second UE, transmitting, to the first UE, a second RRC message indicating an acceptance of the request to establish the unicast connection over the sidelink and a set of parameters of the second UE, establishing the unicast connection over the sidelink with the first UE based on the acceptance of the request and the set of parameters of the second UE, and transmitting or receiving user data over the sidelink using the established unicast connection.

A non-transitory computer-readable medium storing code for wireless communications at a second UE is described. The code may include instructions executable by a processor to receive, from a first UE, a first RRC message including a request to establish a unicast connection over a sidelink between the first UE and the second UE, transmit, to the first UE, a second RRC message indicating an acceptance of the request to establish the unicast connection over the sidelink and a set of parameters of the second UE, establish the unicast connection over the sidelink with the first UE based on the acceptance of the request and the set of parameters of the second UE, and transmit or receiving user data over the sidelink using the established unicast connection.

In some examples of the method, apparatuses, and non-transitory computer-readable medium described herein, establishing the unicast connection over the sidelink with the first UE further may include operations, features, means, or instructions for receiving, from the first UE, a third RRC message (e.g., connection complete message) indicating that the unicast connection has been established.

In some examples of the method, apparatuses, and non-transitory computer-readable medium described herein, establishing the unicast connection may include operations, features, means, or instructions for establishing a security context for the unicast connection based on the set of parameters of the second UE.

In some examples of the method, apparatuses, and non-transitory computer-readable medium described herein, one or more of the first RRC message or the second RRC message may include one or more PDCP parameters, and establishing the unicast connection over the sidelink with the second UE may include operations, features, means, or instructions for setting a PDCP context of the unicast connection based on the one or more PDCP parameters.

In some examples of the method, apparatuses, and non-transitory computer-readable medium described herein, one or more of the first RRC message or the second RRC message may include one or more RLC parameters, and establishing the unicast connection over the sidelink with the second UE may include operations, features, means, or instructions for setting an RLC context of the unicast connection based on the one or more RLC parameters.

In some examples of the method, apparatuses, and non-transitory computer-readable medium described herein, the one or more RLC parameters may include an indication of whether an acknowledged mode or an unacknowledged mode may be supported by the first UE or the second UE.

In some examples of the method, apparatuses, and non-transitory computer-readable medium described herein, one or more of the first RRC message or the second RRC message may include one or more MAC layer parameters, and establishing the unicast connection over the sidelink with the second UE may include operations, features, means, or instructions for setting a MAC context of the unicast connection based on the one or more MAC layer parameters.

In some examples of the method, apparatuses, and non-transitory computer-readable medium described herein, the one or more MAC layer parameters may include an indication of a resource selection algorithm for the first UE or the second UE, an acknowledgment parameter for the first UE or the second UE, a carrier aggregation parameter for the first UE or the second UE, or a combination thereof.

In some examples of the method, apparatuses, and non-transitory computer-readable medium described herein, one or more of the first RRC message or the second RRC message may include one or more PHY layer parameters, and establishing the unicast connection over the sidelink with the second UE may include operations, features, means, or instructions for setting a PHY layer context of the unicast connection based on the one or more PHY layer parameters.

In some examples of the method, apparatuses, and non-transitory computer-readable medium described herein, the one or more PHY layer parameters may include a transmit format for the unicast connection, a radio resource configuration for the unicast connection, a supported band for the unicast connection, or a combination thereof.

In some examples of the method, apparatuses, and non-transitory computer-readable medium described herein, establishing the unicast connection over the sidelink with the first UE may include operations, features, means, or instructions for negotiating IP layer parameters for the unicast connection with the first UE via upper layer messaging carried in the first RRC message or the second RRC message.

Some examples of the method, apparatuses, and non-transitory computer-readable medium described herein may further include operations, features, means, or instructions for transmitting a keep alive message to the first UE for the unicast connection.

In some examples of the method, apparatuses, and non-transitory computer-readable medium described herein, the keep alive message may be transmitted periodically.

In some examples of the method, apparatuses, and non-transitory computer-readable medium described herein, the keep alive message may be transmitted on-demand in response to a trigger.

In some examples of the method, apparatuses, and non-transitory computer-readable medium described herein, the keep alive message may be one or more of a fourth RRC message or a MAC CE message.

Some examples of the method, apparatuses, and non-transitory computer-readable medium described herein may further include operations, features, means, or instructions for initiating a release procedure to end the unicast connection with the first UE.

In some examples of the method, apparatuses, and non-transitory computer-readable medium described herein, establishing the unicast connection over the sidelink with the first UE may include operations, features, means, or instructions for setting up a bearer for the unicast connection and filtering data to and from the bearer based on a layer 2 identifier of the first UE, a layer 2 identifier of the second UE, and a QoS profile of the unicast connection.

In some examples of the method, apparatuses, and non-transitory computer-readable medium described herein, the filtering occurs at a V2X layer.

In some examples of the method, apparatuses, and non-transitory computer-readable medium described herein, the first and second RRC messages may be carried by one or more sidelink signaling radio bearers.

Some examples of the method, apparatuses, and non-transitory computer-readable medium described herein may further include operations, features, means, or instructions for determining to accept the request of the first RRC message based on a transmission/reception capability, an amount of radio resources available for the unicast connection, an issue for scheduling the unicast connection, a particular service indicated for the unicast connection, or a combination thereof.

In some examples of the method, apparatuses, and non-transitory computer-readable medium described herein, the set of parameters may include a set of capabilities, connection parameters, or a combination thereof for the second UE.

In some examples of the method, apparatuses, and non-transitory computer-readable medium described herein, the first RRC message may include a first set of parameters of the first UE, where the set of parameters of the second UE is based on the first set of parameters of the first UE.

DETAILED DESCRIPTION

Some wireless communication systems may be used to facilitate communications with various devices, which may include vehicles, and these systems may sometimes be referred to as vehicle-to-everything (V2X) communication systems. V2X communication systems may be configured to convey information between vehicles in one or more unencrypted messages that may lead to potential tracking by a third party. However, these unencrypted messages may impact security protections of one or more of the vehicles and may also include different characteristics that impact resource allocations for the unencrypted message transmissions.

Accordingly, a unicast connection between two wireless devices (e.g., user equipment (UEs), vehicles, sensors, etc.) may be established that provides efficient techniques for sidelink communications (e.g., V2X communications, device-to-device communications (D2D), etc.). For example, a connection-oriented link may be established by a V2X layer of a protocol stack between the two wireless devices that supports an optimized access stratum (AS) layer configuration (e.g., over-the-air) for higher throughput, supports enhanced security protection, and allows more efficient resource usage. To establish the unicast connection over the sidelink, a first UE may transmit a request message to a second UE, and the second UE may transmit a response message accepting the request to the first UE.

Additionally, in some cases, the first UE may transmit a connection complete message to the second UE and establish a security context with the second UE as part of establishing the unicast connection over the sidelink. In some cases, the request message, the response message, and the connection complete message may be transmitted via radio resource control (RRC) signaling. Additionally, the unicast connection may be established based on parameters (e.g., capabilities, connection parameters, etc.) for the first UE and/or the second UE that are transmitted in the respective request message and/or response message. For example, the parameters may include packet data convergence protocol (PDCP) parameters, radio link control (RLC) parameters, medium access control (MAC) layer parameters, physical (PHY) layer parameters, capabilities of either UE 115, or a combination thereof.

Aspects of the disclosure are initially described in the context of a wireless communications system. An additional wireless communications system, data plane operations, and a process flow are then provided to illustrate aspects of the disclosure. Aspects of the disclosure are further illustrated by and described with reference to apparatus diagrams, system diagrams, and flowcharts that relate to unicast sidelink establishment.

Figure 1:
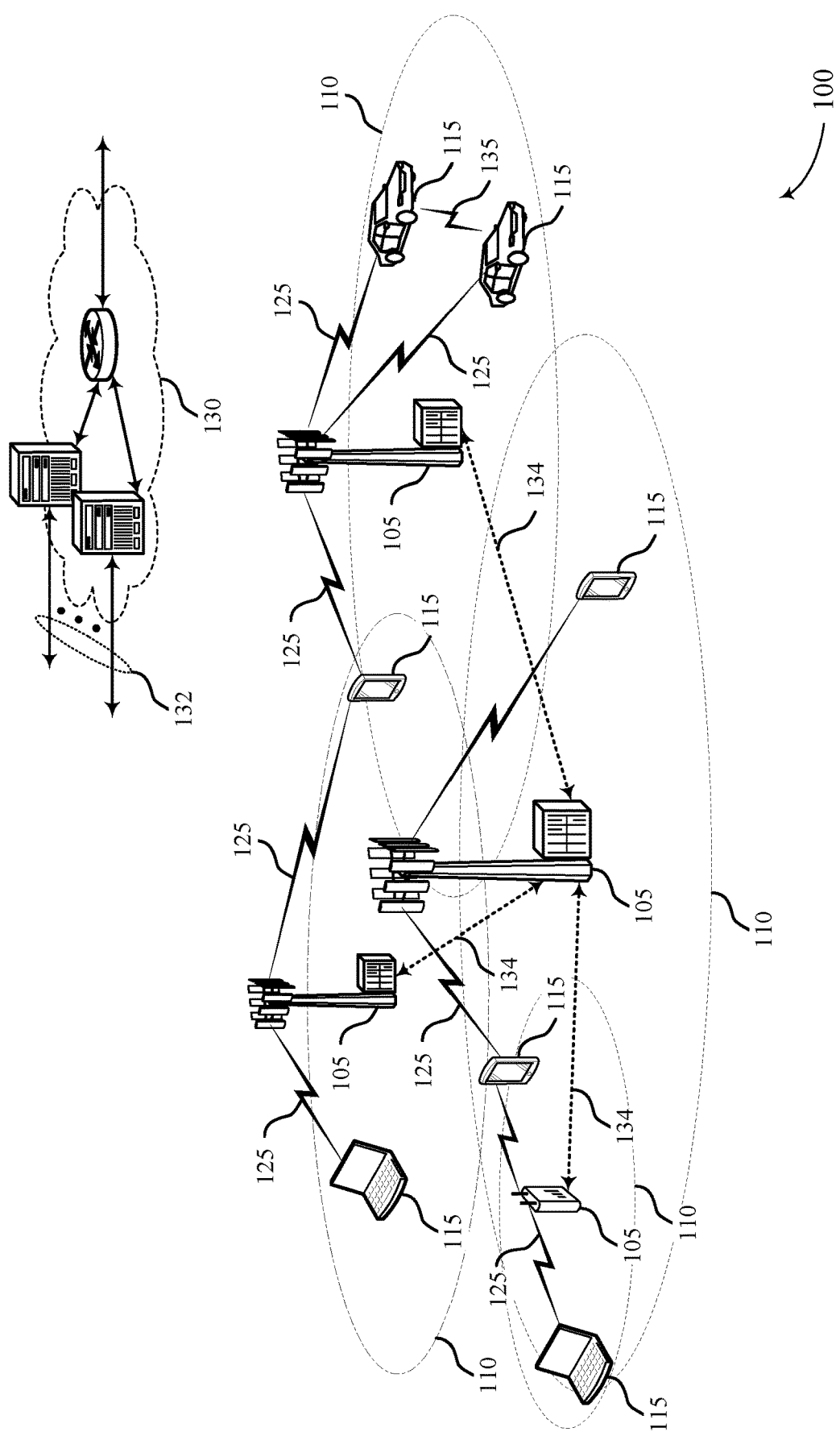
FIG. 1 illustrates an example of a system for wireless communications that supports unicast sidelink establishment in accordance with aspects of the present disclosure.

FIG. 1 illustrates an example of a wireless communications system 100 that supports unicast sidelink establishment in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

Wireless communications system 100 may support direct communication between UEs 115 over a sidelink 135 (e.g., using a peer-to-peer (P2P), D2D protocol, or ProSe direct communications). Sidelink communication may be used for D2D media-sharing, vehicle-to-vehicle (V2V) communication, V2X communication (e.g., cellular V2X (cV2X) communication, enhanced V2X (eV2X) communication, etc.), emergency rescue applications, etc. One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a first UE 115 of a sidelink connection) and a receiving device (e.g., a second UE 115 of a sidelink connection), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 or UE 115 may use multiple antennas or antenna arrays to conduct beamforming operations for directional communications with a UE 115 recipient. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105, a first UE 115, or a receiving device, such as a second UE 115) a beam direction for subsequent transmission and/or reception by the base station 105.

Some signals, such as data signals associated with a particular receiving device, may be transmitted by a base station 105 or a first UE 115 in a single beam direction (e.g., a direction associated with the receiving device, such as a second UE 115). In some examples, the beam direction associated with transmissions along a single beam direction may be determined based at least in part on a signal that was transmitted in different beam directions. For example, a receiving UE 115 may receive one or more of the signals transmitted by a base station 105 or a transmitting UE 115 in different directions, and the receiving UE 115 may report to the base station 105 or the transmitting UE 115 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or PDCP layer may be IP-based. In cases where D2D or V2X communications are used, a V2X layer may provide related protocols, and in some cases may use ProSe direct communications protocols (e.g., PC5 signaling). An RLC layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the PHY layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink component carriers (CCs) and one or more uplink CCs according to a CA configuration. CA may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems, data transmissions (e.g., target traffic) may be periodically broadcasted from a UE 115 or base station 105. For example, in V2X communications, a vehicle (e.g., or a UE 115) may broadcast safety messages (with a known size) periodically to enable nearby vehicles, sensors, or additional UEs 115 to receive necessary information about the vehicle broadcasting the safety messages. However, in other wireless communications systems (e.g., eV2X communications for NR), corresponding data transmissions may include different characteristics, such as a higher bandwidth data (e.g., to support sensor sharing), event driven traffic (e.g., to support applications like platooning/cooperative adaptive cruise control (CACC)), and/or interactive/transactional traffic due to advanced sensor sharing for different applications (e.g., video streaming). Accordingly, these different characteristics may lead to inefficient resource allocations, data throughput, and less secure communications if periodic data transmissions are broadcasted (e.g., unencrypted).

Wireless communications system 100 may support efficient techniques for establishing a unicast link (e.g., connection) between two wireless devices (e.g., UEs 115, vehicles, sensors, etc.). For example, a connection-oriented link (e.g., the unicast link) may be established by a V2X layer of a protocol stack between the two wireless devices that supports an optimized AS layer configuration (e.g., over-the-air) for higher throughput (e.g., 64 quadrature amplitude modulation (QAM), CA, etc.), supports enhanced security protection, and allows more efficient resource usage (e.g., power control, beam management, etc.). In some cases, the unicast connection may be established over a sidelink 135 between the two wireless devices (e.g., between a first UE 115 and a second UE 115), for example, without going through a base station 105. To establish the unicast connection over the sidelink 135, a first UE 115 may transmit a request message to a second UE 115, and the second UE 115 may transmit a response message accepting the request to the first UE 115.

Additionally, the first UE 115 may transmit a connection complete message to the second UE 115 and establish a security context with the second UE 115 as part of establishing the unicast connection over the sidelink 135. In some cases, the request message, the response message, and the connection complete message may be transmitted via RRC signaling (e.g., over PC5 to have unified PC5 and air interface (Uu) management). Additionally, the unicast connection may be established based on parameters (e.g., capabilities, connection parameters, etc.) for the first UE 115 and/or the second UE 115 that are transmitted in the respective request message and/or response message. For example, the parameters may include PDCP parameters, RLC parameter, MAC parameters, PHY layer parameters, capabilities of either UE 115, or a combination thereof.

Figure 2:
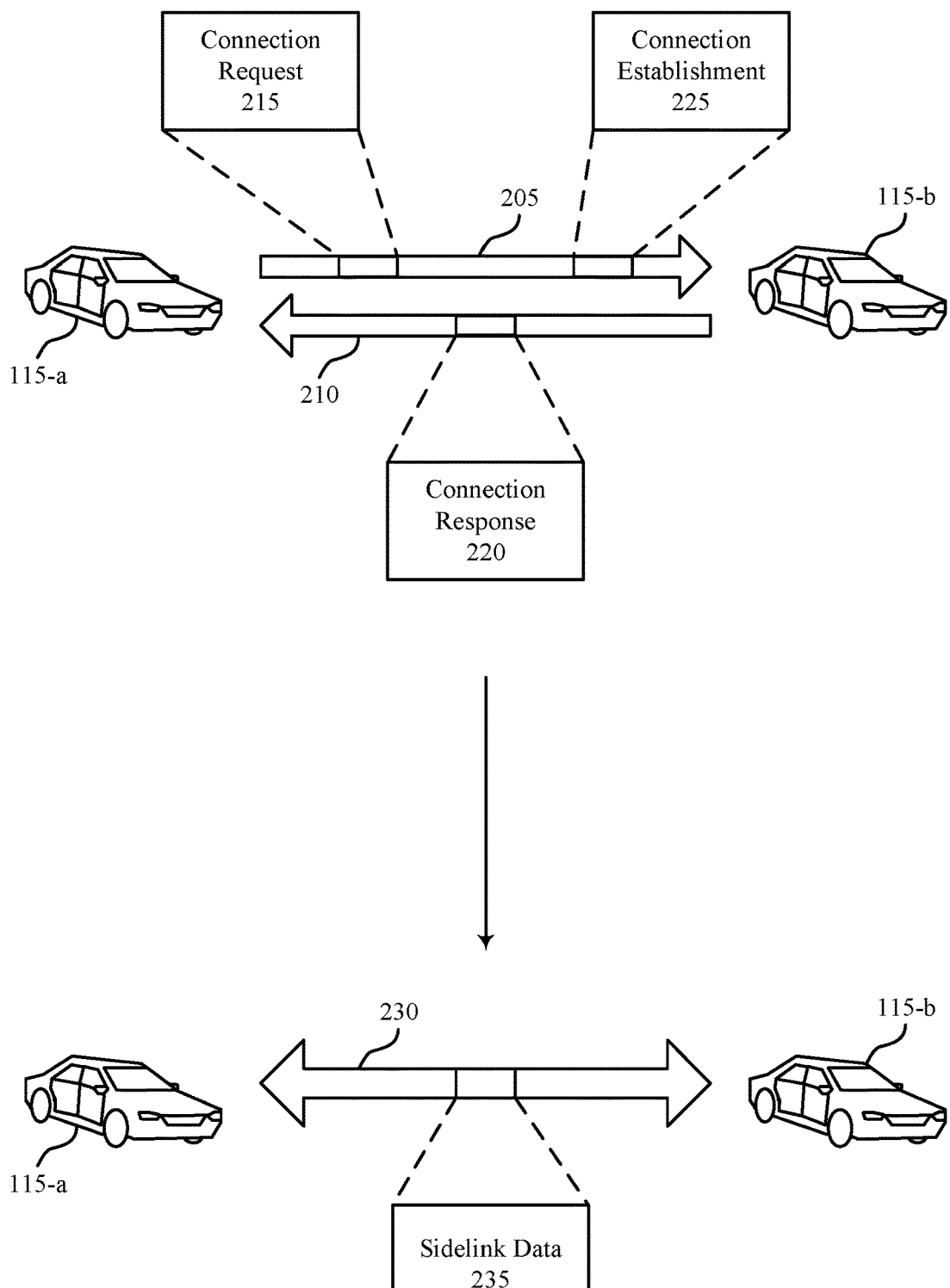
FIG. 2 illustrates an example of a wireless communications system that supports unicast sidelink establishment in accordance with aspects of the present disclosure.

FIG. 2 illustrates an example of a wireless communications system 200 that supports unicast sidelink establishment in accordance with aspects of the present disclosure. In some examples, wireless communications system 200 may implement aspects of wireless communications system 100. Wireless communications system 200 may include a first UE 115-a and a second UE 115-b, which may be examples of UEs 115 as described above with reference to FIG. 1. As described herein, UE 115-a may attempt to establish a unicast connection over a sidelink with UE 115-b. As shown, UE 115-a and UE 115-b may be vehicles, where the unicast connection over the sidelink may be a V2X communication link between UE 115-a (e.g., a first vehicle) and UE 115-b (e.g., a second vehicle). Additionally or alternatively, the unicast connection over the sidelink may generally be used for sidelink communications (e.g., D2D communications) between any two UEs 115. In some cases, UE 115-a may be referred to as an initiating UE 115 that initiates the unicast connection procedure, and UE 115-b may be referred to as a target UE 115 that is targeted for the unicast connection procedure by the initiating UE 115.

For establishing the unicast connection, AS parameters may be configured and negotiated between UE 115-a and UE 115-b. For example, a transmission and reception capability matching may be negotiated between UE 115-a and UE 115-b. Each UE 115 (e.g., a V2X UE 115) may have different capabilities (e.g., transmission and reception capabilities, 64QAM, transmission diversity, CA capabilities, etc.). In some cases, different services may be supported at the upper layers of corresponding protocol stacks for UE 115-a and UE 115-b. Additionally, a security association may be established between UE 115-a and UE 115-b for the unicast connection. Unicast traffic may benefit from security protection at a link level (e.g., Integrity Protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 115-a and UE 115-b.

In some cases, UE 115-b may create a service announcement (e.g., a service capability message) to transmit over a cellular network (e.g., a CV2X network) to assist the unicast connection establishment. Conventionally, UE 115-a may identify and locate candidates for unicast communications based on a basic service message (BSM) broadcasted unencrypted by nearby UEs 115 (e.g., UE 115-b). The BSM may include location information, security and identity information, and vehicle information (e.g., speed, maneuver, size, etc.) for the corresponding UE 115 broadcasting the unencrypted BSM. However, for different wireless communications systems (e.g., D2D or V2X communications), a discovery channel may not be configured so that UE 115-*a* is able to detect the BSM(s). Accordingly, the service announcement transmitted by UE 115-*b* and other nearby UEs 115 (e.g., a discovery signal) may be an upper layer signal and broadcasted (e.g., in an NR sidelink broadcast). In some cases, UE 115-*b* may include one or more parameters for itself in the service announcement, including connection parameters and/or capabilities UE 115-*b* possesses. UE 115-*a* may then monitor for and receive the broadcasted service announcement to identify potential UEs 115 for corresponding unicast connections. In some cases, UE 115-*a* may identify the potential UEs 115 based on the capabilities each UE 115 indicates in their respective service announcements.

The service announcement may include information to assist UE 115-*a* (e.g., or any initiating UE 115) to identify the UE 115 transmitting the service announcement. For example, the service announcement may include channel information where direct communication requests can be sent. In some cases, the channel information may be specific to a radio access technology (RAT) (e.g., LTE or NR) and may include a resource pool that UE 115-*a* can use for transmitting the communication request. Additionally, the service announcement may include a specific destination address for the UE 115 (e.g., a layer 2 (L2) destination address) if the destination address is different from the current address (e.g., the address of the streaming provider or the UE 115 transmitting the service announcement). The service announcement may also include a network or transport layer for UE 115-*a* to transmit a communication request on. For example, the network or transport layer may indicate a port number of an application for the UE 115 transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and quality of service (QoS)-related parameters.

After identifying a potential unicast connection target (e.g., UE 115-*b*), UE 115-*a* (e.g., the initiating UE 115) may transmit a connection request 215 to the identified target. In some cases, the connection request 215 may be a first RRC message transmitted by UE 115-*a* to request a unicast connection with the identified target, UE 115-*b* (e.g., an RRCDirectConnectionSetupRequest message). For example, the unicast connection may be a PC5 unicast link, and the connection request 215 may be an RRC connection setup request message. Additionally, UE 115-*a* may use a sidelink signaling radio bearer 205 to transport the connection request 215.

After receiving the connection request 215, UE 115-*b* may determine whether to accept or reject the connection request 215. UE 115-*b* may base this determination on a transmission/reception capability, an ability to accommodate the unicast connection over the sidelink, a particular service indicated for the unicast connection, the contents to be transmitted over the unicast connection, or a combination thereof. For example, if UE 115-*a* wants to use a first RAT to transmit or receive data, but UE 115-*b* does not support the first RAT, then UE 115-*b* may reject the connection request 215. Additionally or alternatively, UE 115-*b* may reject the connection request 215 based on being unable to accommodate the unicast connection over the sidelink due to one or more conflicts, such as a limited radio resource, a scheduling issue, etc. Accordingly, UE 115-*b* may transmit an indication of whether the request is accepted or rejected in a connection response 220. Similar to UE 115-*a* and the connection request 215, UE 115-*b* may use a sidelink signaling radio bearer 210 to transport the connection response 220. Additionally, the connection response 220 may be a second RRC message transmitted by UE 115-*b* in response to the connection request 215 (e.g., an RRCDirectConnectionResponse message).

In some cases, sidelink signaling radio bearers 205 and 210 may be a same sidelink radio signal bearer or may be separate sidelink signaling radio bearers. Accordingly, an RLC layer acknowledged mode (AM) may be used for sidelink signaling radio bearers 205 and 210. A UE 115 that supports the unicast connection may listen on a logical channel associated with the sidelink signaling radio bearers. In some cases, the AS layer may pass information directly through RRC signaling (e.g., control plane) instead of a V2X layer (e.g., data plane).

If the connection response 220 indicates that UE 115-*b* accepted the connection request 215, UE 115-*a* may then transmit a connection establishment 225 message on the sidelink signaling radio bearer 205 to indicate that the unicast connection setup is complete. In some cases, the connection establishment 225 may be a third RRC message (e.g., an RRCDirectConnectionSetupComplete message). Each of the connection request 215, the connection response 220, and the connection establishment 225 may use a basic capability when being transported from one of the UEs 115 to the other UE 115 to enable each UE 115 to be able to receive and decode a corresponding transmission (e.g., RRC message).

Additionally, identifiers may be used for each of the connection request 215, the connection response 220, and the connection establishment 225 (e.g., the RRC signaling). For example, the identifiers may indicate which UE 115 is transmitting which message and/or for which UE 115 the message is intended. For PHY channels, the RRC signaling and any subsequent data transmissions may use a same identifier (e.g., L2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a PHY layer ACK may be used for ensuring the corresponding messages are transmitted and received properly.

One or more information elements may be included in the connection request 215 and/or the connection response 220 for UE 115-*a* and/or UE 115-*b*, respectively, to enable negotiation of corresponding AS layer parameters for the unicast connection. For example, UE 115-*a* and/or UE 115-*b* may include PDCP parameters in a corresponding unicast connection setup message to set a PDCP context for the unicast connection. In some cases, the PDCP context may indicate whether or not PDCP duplication is utilized for the unicast connection. Additionally, UE 115-*a* and/or UE 115-*b* may include RLC parameters when establishing the unicast connection to set an RLC context of the unicast connection. For example, the RLC context may indicate whether an AM (e.g., a reordering timer (t-reordering) is used) or an unacknowledged mode (UM) is used for the RLC layer of the unicast communications.

Additionally, UE 115-*a* and/or UE 115-*b* may include MAC parameters to set a MAC context for the unicast connection. In some cases, the MAC context may enable resource selection algorithms, a HARQ feedback scheme (e.g., ACK or negative ACK (NACK) feedback), parameters for the HARQ feedback scheme, CA, or a combination thereof for the unicast connection. Additionally, UE 115-a and/or UE 115-b may include PHY layer parameters when establishing the unicast connection to set a PHY layer context for the unicast connection. For example, the PHY layer context may indicate a transmission format (unless transmission profiles are included for each UE 115) and a radio resource configuration (e.g., bandwidth part (BWP), numerology, etc.) for the unicast connection. These information elements may be supported for different frequency range configurations (e.g., frequency range 1 (FR1) for a sub-6 GHz frequency band, a frequency range 2 (FR2) for mmW, etc.).

In some cases, a security context may also be set for the unicast connection (e.g., after the connection establishment 225 message is transmitted). Before a security association (e.g., security context) is established between UE 115-a and UE 115-b, the sidelink signaling radio bearers 205 and 210 may not be protected (e.g., unencrypted). After a security association is established, the sidelink signaling radio bearers 205 and 210 may be protected (e.g., encrypted). Accordingly, the security context may enable secure data transmissions over the unicast connection and the sidelink signaling radio bearers 205 and 210. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, UE 115-b may base its decision on whether to accept or reject the connection request 215 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, UE 115-a and UE 115-b may communicate using the unicast connection over a sidelink 230, where sidelink data 235 is transmitted between the two UEs 115. In some cases, the sidelink data 235 may include RRC messages transmitted between the two UEs 115. To maintain this unicast connection on sidelink 230, UE 115-a and/or UE 115-b may transmit a keep alive message (e.g., RRCDirectLinkAlive message, a fourth RRC message, etc.). In some cases, the keep alive message may be triggered periodically or on-demand (e.g., event-triggered). Accordingly, the triggering and transmission of the keep alive message may be invoked by UE 115-a or by both UE 115-a and UE 115-b. Additionally or alternatively, a MAC control element (CE) (e.g., defined over sidelink 230) may be used to monitor the status of the unicast connection on sidelink 230 and maintain the connection. When the unicast connection is no longer needed (e.g., UE 115-a travels far enough away from UE 115-b), either UE 115-a and/or UE 115-b may start a release procedure to drop the unicast connection over sidelink 230. Accordingly, subsequent RRC messages may not be transmitted between UE 115-a and UE 115-b on the unicast connection after the unicast connection over sidelink 230 is dropped.

Figure 3:
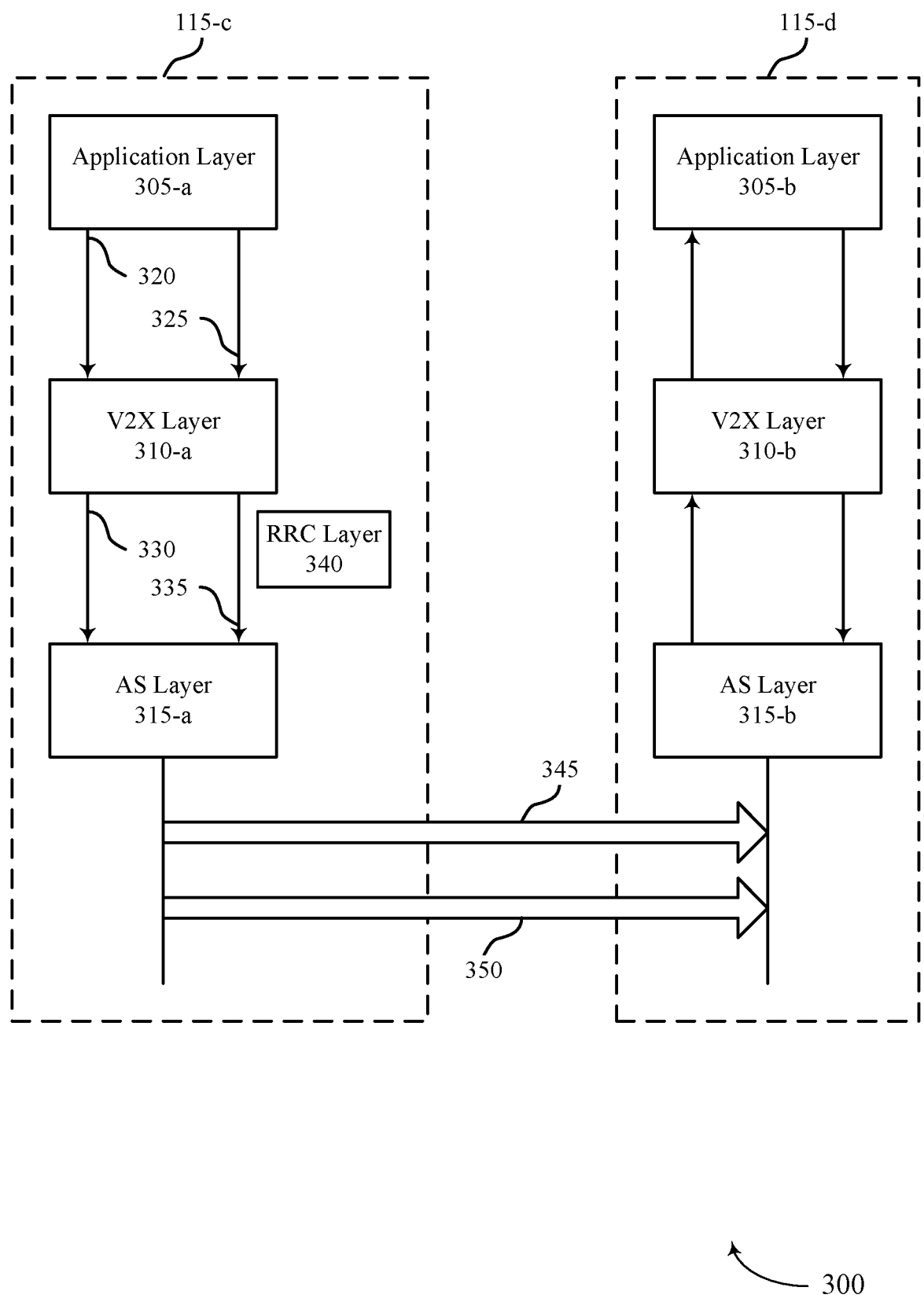
FIG. 3 illustrates an example of data plane operations that support unicast sidelink establishment in accordance with aspects of the present disclosure.

FIG. 3 illustrates an example of a data plane operations 300 that supports unicast sidelink establishment in accordance with aspects of the present disclosure. In some examples, data plane operations 300 may implement aspects of wireless communications systems 100 and/or 200. Data plane operations 300 may include protocol stacks in a first UE 115-c and a second UE 115-d, which may be examples of UEs 115 as described above with reference to FIGS. 1 and 2. UE 115-c and UE 115-d may have established a unicast connection over a sidelink as described herein. Accordingly, unicast data may be transmitted according to data plane operations 300 between UE 115-c and UE 115-d. Each protocol stack in each UE 115 may include a respective application layer 305, a V2X layer 310 (e.g., or any sidelink layer, such as a D2D layer, P2P layer, etc.), and an AS layer 315. Additionally, the protocol stack of UE 115-c may include an RRC layer 340.

Application layer 305-a of UE 115-a may indicate a provider service ID (PSID), a destination station ID, and data to V2X layer 310-a through message 320. Additionally, application layer 305-a may indicate the destination station ID and a QoS profile to V2X layer 310-a through message 325 (e.g., via RRC signaling). Based on the destination station ID, V2X layer 310-a may identify a destination L2 ID for UE 115-d. V2X layer 310-a may indicate this destination L2 ID, a source L2 ID (e.g., for UE 115-c), a bearer ID, and the data to AS layer 315-a. In some cases, unicast data may be identified implicitly based on the L2 ID address space. Additionally, the bearer ID may identify a sidelink signaling radio bearer for transmitting RRC messages to UE 115-d and/or receiving RRC messages from UE 115-d. V2X layer 310-a may create and maintain a filter for the sidelink radio signaling radio bearer, where the data is filtered into the sidelink radio signaling radio bearer based on the destination L2 ID, a source L2 ID, and the QoS profile.

RRC layer 340 may pass back the bearer ID when an RRC link to UE 115-d is established. In some cases, different types of sidelink radio signaling radio bearer (e.g., PC5 sidelink bearers) may not have a limitation on the number of signaling radio bearers can be configured. V2X layer 310-a may pass the destination L2 ID to AS layer 315-a through message 335, where the destination L2 ID is included in RRC transmissions 345, such that UE 115-d may identify if the RRC transmissions 345 are indicated for UE 115-d and establish the RRC link (e.g., unicast connection). After the RRC link is established, unicast data can be transmitted between UE 115-c and UE 115-d over a sidelink 350.

In some cases, a same PHY layer may be used for the unicast data transmissions between UE 115-c and UE 115-d that is used for broadcast or groupcast (e.g., multicast) transmissions. Additionally, HARQ feedback may be used for the unicast data transmissions, as well as an RLC AM/UM. Accordingly, the HARQ feedback and the RLC AM or UM may be configured when establishing the RRC link. Additionally, the RLC AM or UM may be linked with a QoS requirement (e.g., as indicated in the QoS profile) and may be based on a latency requirement for the unicast data transmissions. In some cases, different PHY layer measures may be used to monitor a status of the sidelink 350. For example, a MAC CE, activation/deactivation of CCs, or a DRX cycle may be used to monitor the status of the sidelink 350 for transmitting the unicast data. Additionally or alternatively, RLC UM may be used for the unicast data transmissions.

Figure 4:
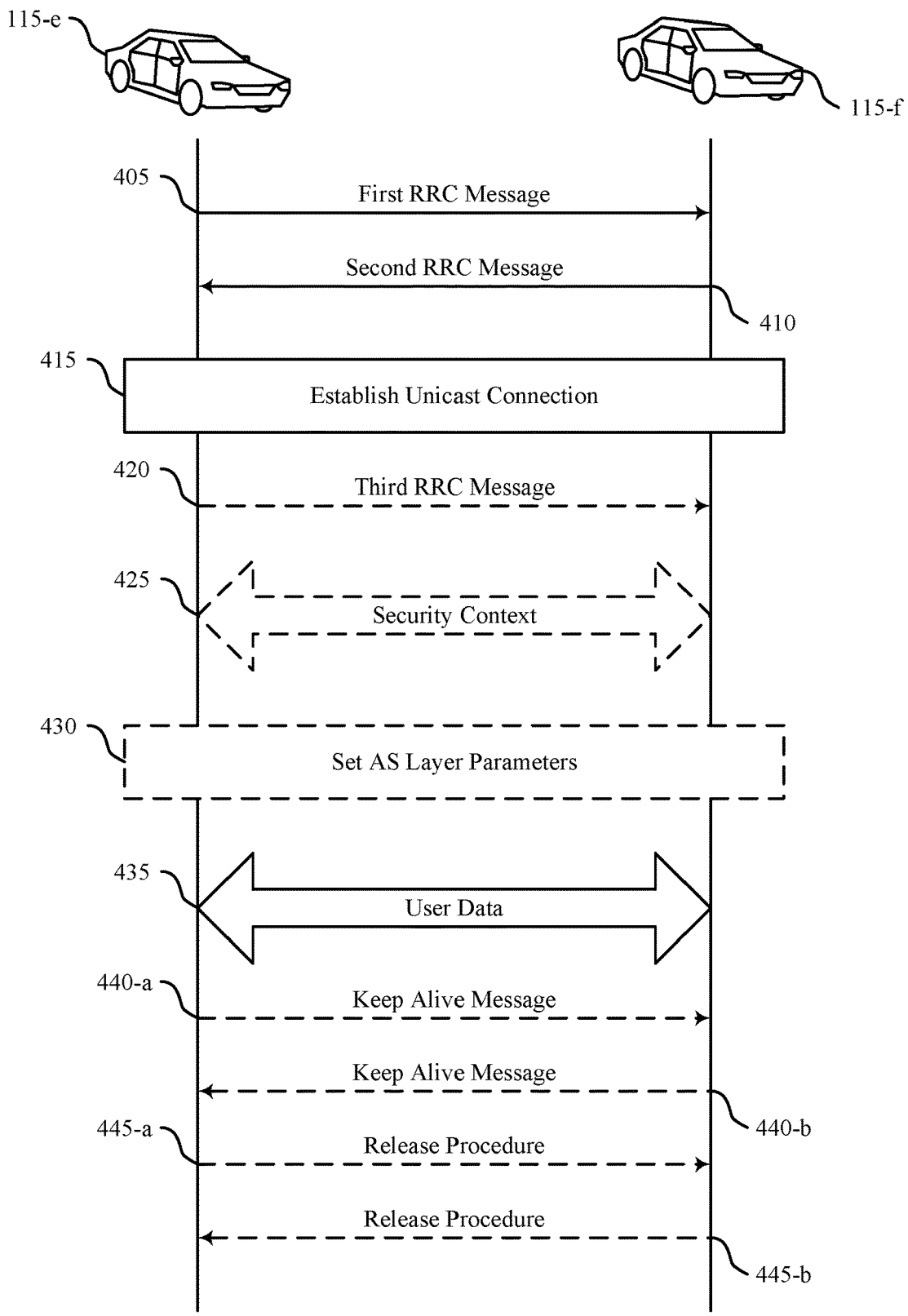
FIG. 4 illustrates an example of a process flow that supports unicast sidelink establishment in accordance with aspects of the present disclosure.

FIG. 4 illustrates an example of a process flow 400 that supports unicast sidelink establishment in accordance with aspects of the present disclosure. In some examples, process flow 400 may implement aspects of wireless communications systems 100 and/or 200. Process flow 400 may include a first UE 115-e and a second UE 115-f, which may be examples of UEs 115 as described above with reference to FIGS. 1-3. As described herein, UE 115-*e* may attempt to establish a unicast connection over a sidelink with UE 115-*f*. As shown, UE 115-*e* and UE 115-*f* may be vehicles, where the unicast connection over the sidelink may be a V2X communication link between UE 115-*e* (e.g., a first vehicle) and UE 115-*f* (e.g., a second vehicle). Additionally or alternatively, the unicast connection over the sidelink may generally be used for sidelink communications between any two UEs 115. In some cases, UE 115-*e* may be referred to as an initiating UE 115 that initiates the unicast connection procedure, and UE 115-*f* may be referred to as a target UE 115 that is targeted for the unicast connection procedure by the initiating UE 115.

In the following description of the process flow 400, the operations between UE 115-*e* and UE 115-*f* may be performed in different orders or at different times. Certain operations may also be left out of the process flow 400, or other operations may be added to the process flow 400. It is to be understood that while UE 115-*e* and UE 115-*f* are shown performing a number of the operations of process flow 400, any wireless device may perform the operations shown.

At 405, UE 115-*e* may transmit, to UE 115-*f*, a first RRC message (e.g., a connection request message) including a request to establish a unicast connection over a sidelink between UE 115-*e* and UE 115-*f*. In some cases, UE 115-*e* may receive an indication of a service offered by UE 115-*f*, where UE 115-*e* transmits the first RRC message based on the indication of the service.

At 410, UE 115-*e* may receive, from UE 115-*f*, a second RRC message (e.g., a connection response message) indicating an acceptance of the request to establish the unicast connection over the sidelink and a set of parameters of UE 115-*f*. In some cases, the set of parameters may include a set of capabilities, connection parameters, or a combination thereof for UE 115-*f*. Additionally or alternatively, the first RRC message may include a first set of parameters of UE 115-*e*, where the set of parameters of UE 115-*f* are based on the first set of parameters of UE 115-*e*. In some cases, UE 115-*f* may determine to accept the request of the first RRC message based on one or more of a transmission/reception capability, an amount of radio resources available for the unicast connection, an issue for scheduling the unicast connection, or a particular service indicated for the unicast connection. Additionally, the first and second RRC messages may be carried by one or more sidelink signaling radio bearers.

At 415, UE 115-*e* and UE 115-*f* may establish the unicast connection over the sidelink based on the acceptance of the request and the set of parameters of UE 115-*f*.

At 420, UE 115-*e* may transmit, to UE 115-*f*, a third RRC message (e.g., a connection establishment message) indicating that the unicast connection has been established.

At 425, UE 115-*e* and UE 115-*f* may establish a security context for the unicast connection based on the set of parameters of UE 115-*f*. In some cases, UE 115-*e* and UE 115-*f* may negotiate IP layer parameters for the unicast connection via upper layer messaging carried in the first RRC message or the second RRC message. Additionally, UE 115-*e* and/or UE 115-*f* may set up a bearer for the unicast connection and may filter data to and from the bearer based on an L2 ID of UE 115-*e* (e.g., source L2 ID), an L2 ID of UE 115-*f* (e.g., destination L2 ID), and a QoS profile of the unicast connection. In some cases, the filtering may occur at a V2X layer (e.g., of UE 115-*e*).

At 430, UE 115-*e* and UE 115-*f* may set one or more AS layer parameters as part of establishing the unicast connection over the sidelink. For example, one or more of the first RRC message or the second RRC message may include one or more PDCP parameters, and UE 115-*e* and/or UE 115-*f* may set a PDCP context of the unicast connection based on the one or more PDCP parameters. Additionally, one or more of the first RRC message or the second RRC message may include one or more RLC parameters, and UE 115-*e* and UE 115-*f* may set an RLC context of the unicast connection based on the one or more RLC parameters. In some cases, the one or more RLC parameters may include an indication of whether an AM or a UM is supported by UE 115-*e* or UE 115-*f* for the unicast connection.

Additionally, one or more of the first RRC message or the second RRC message may include one or more MAC layer parameters, and UE 115-*e* and UE 115-*f* may set a MAC layer context of the unicast connection based on the one or more MAC layer parameters. In some cases, the one or more MAC layer parameters may include one or more of an indication of a resource selection algorithm for UE 115-*e* or UE 115-*f*, an ACK parameter for UE 115-*e* or UE 115-*f*, or a CA parameter for UE 115-*e* or UE 115-*f* for the unicast connection. Additionally, one or more of the first RRC message or the second RRC message may include one or more PHY layer parameters, and UE 115-*e* and UE 115-*f* may set a PHY layer context of the unicast connection based on the one or more PHY layer parameters. In some cases, the one or more PHY layer parameters may include one or more of a transmit format for the unicast connection, a radio resource configuration for the unicast connection, or a supported band for the unicast connection.

At 435, UE 115-*e* and UE 115-*f* may transmit or receive user data over the sidelink using the established unicast connection.

At 440, UE 115-*e* and/or UE 115-*f* may maintain the sidelink connection status for the unicast connection. For example, at 440-*a*, UE 115-*e* may transmit a keep alive message to UE 115-*f* for the unicast connection. Additionally or alternatively, at 440-*b*, UE 115-*f* may transmit the keep alive message to UE 115-*e* for the unicast connection. In some cases, the keep alive message may be transmitted periodically or on-demand in response to a trigger. Additionally, the keep alive message may be a fourth RRC message and/or a MAC CE message.

At 445, UE 115-*e* and/or UE 115-*f* may start a release procedure to drop the unicast connection. For example, at 445-*a*, UE 115-*e* may initiate a release procedure to end the unicast connection with UE 115-*f*. Additionally or alternatively, at 445-*b*, UE 115-*f* may initiate the release procedure to end the unicast connection with UE 115-*e*.

Figure 5:
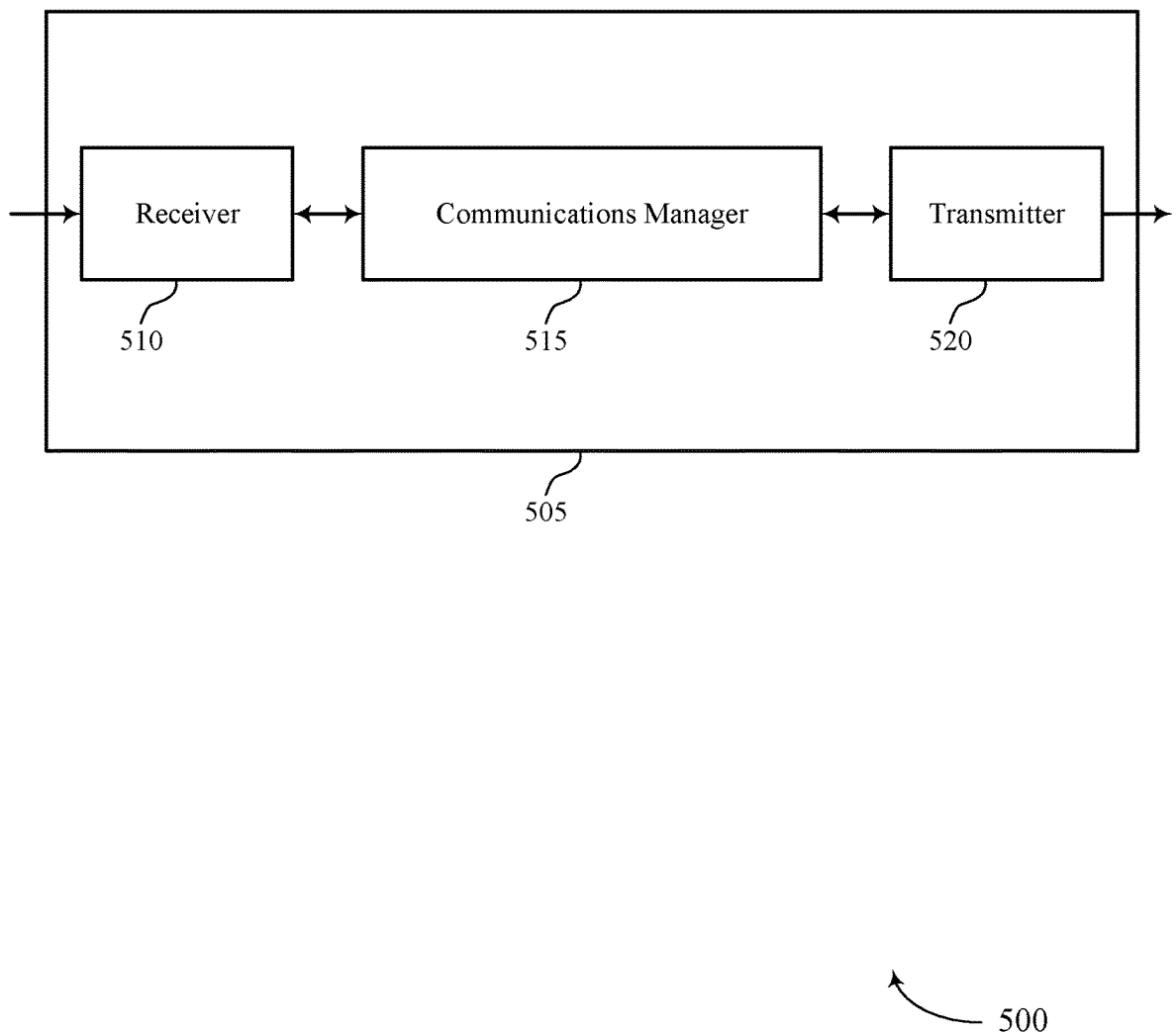
FIGS. 5 and 6 show block diagrams of devices that support unicast sidelink establishment in accordance with aspects of the present disclosure.

FIG. 5 shows a block diagram 500 of a device 505 that supports unicast sidelink establishment in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to unicast sidelink establishment, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may include various features, as described below, though only some features may be used when the device 505 is acting as a first UE (e.g., initiating UE), while other features may be limited to use when the device 505 is acting as a second UE (e.g., target UE). For example, when acting as the first UE, the communications manager 515 may transmit, to the second UE, a first RRC message including a request to establish a unicast connection over a sidelink between the first UE and the second UE. In some cases, the communications manager 515 receive, from the second UE, a second RRC message indicating an acceptance of the request to establish the unicast connection over the sidelink and a set of parameters of the second UE. The communications manager 515 may then establish the unicast connection over the sidelink with the second UE based on the acceptance of the request and the set of parameters of the second UE. Accordingly, the communications manager 515 may transmit or receiving user data over the sidelink using the established unicast connection.

Additionally or alternatively, when operating as the second UE, the communications manager 515 may receive, from the first UE, a first RRC message including a request to establish a unicast connection over a sidelink between the first UE and the second UE. In some cases, the communications manager 515 may transmit, to the first UE, a second RRC message indicating an acceptance of the request to establish the unicast connection over the sidelink and a set of parameters of the second UE. The communications manager 515 may then establish the unicast connection over the sidelink with the first UE based on the acceptance of the request and the set of parameters of the second UE. Accordingly, the communications manager 515 may transmit or receiving user data over the sidelink using the established unicast connection. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
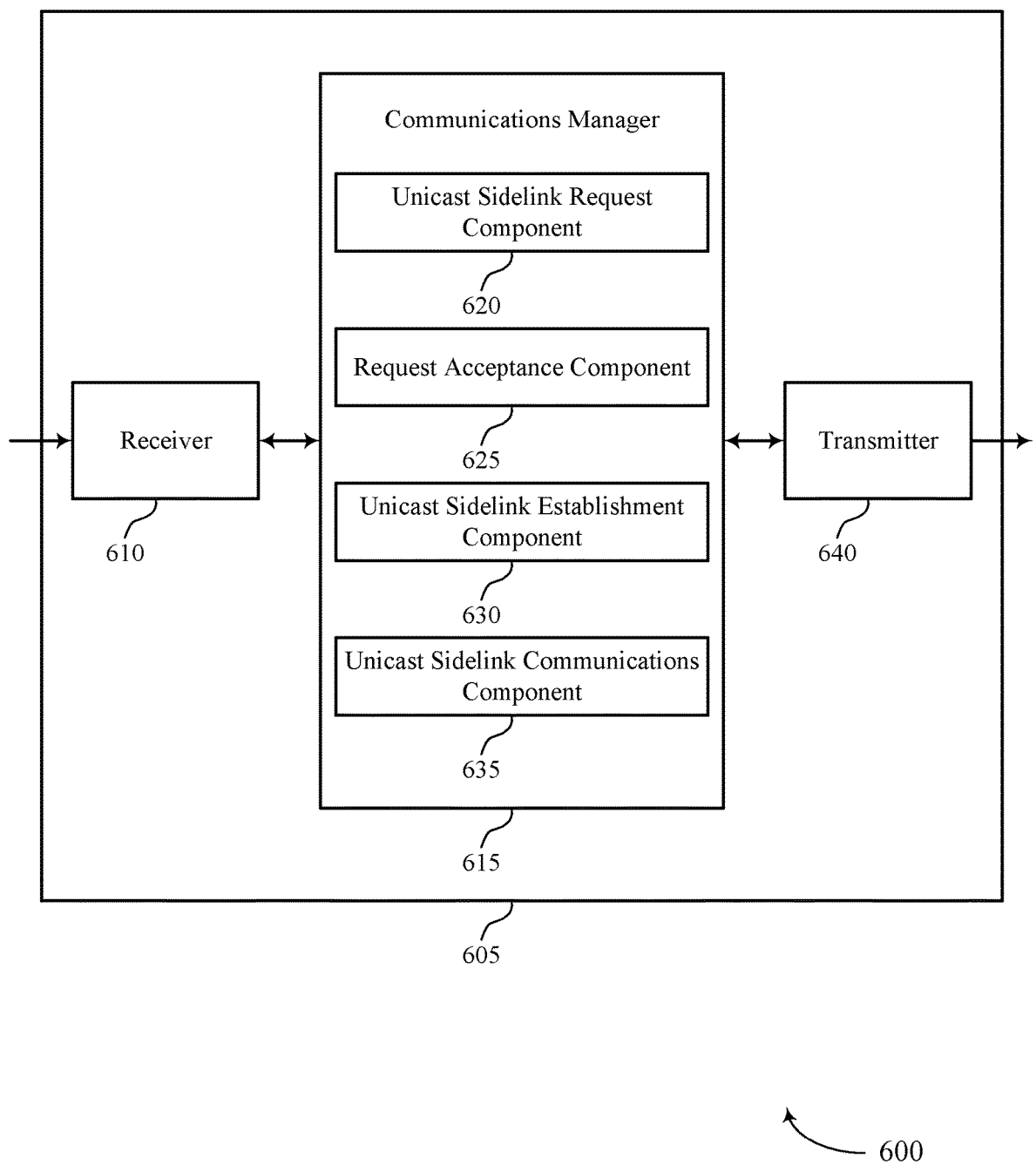

FIG. 6 shows a block diagram 600 of a device 605 that supports unicast sidelink establishment in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to unicast sidelink establishment, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include various features, as described below, though only some features may be used when the device 605 is acting as a first UE (e.g., initiating UE), while other features may be limited to use when the device 605 is acting as a second UE (e.g., target UE). The communications manager 615 may include a unicast sidelink request component 620, a request acceptance component 625, a unicast sidelink establishment component 630, and a unicast sidelink communications component 635. The communications manager 615 may be an example of aspects of the communications manager 810 described herein.

When the device 605 is acting as the first UE, the communications manager 615 may include and use a unicast sidelink request component 620. The unicast sidelink request component 620 may transmit, to a second UE, a first RRC message including a request to establish a unicast connection over a sidelink between the first UE and the second UE.

When the device 605 is acting as the first UE, the communications manager 615 may include and use a request acceptance component 625. The request acceptance component 625 may receive, from the second UE, a second RRC message indicating an acceptance of the request to establish the unicast connection over the sidelink and a set of parameters of the second UE.

When the device 605 is acting as the first UE, the communications manager 615 may include and use a unicast sidelink establishment component 630. The unicast sidelink establishment component 630 may establish the unicast connection over the sidelink with the second UE based on the acceptance of the request and the set of parameters of the second UE.

When the device 605 is acting as the first UE, the communications manager 615 may include and use a unicast sidelink communications component 635. The unicast sidelink communications component 635 may transmit or receiving user data over the sidelink using the established unicast connection.

When the device 605 is acting as the second UE, the communications manager 615 may also include and use the unicast sidelink request component 620. However, when the device 605 is acting as the second UE the unicast sidelink request component 620 may receive, from a first UE, a first RRC message including a request to establish a unicast connection over a sidelink between the first UE and the second UE.

When the device 605 is acting as the second UE, the communications manager 615 may also include and use the request acceptance component 625. However, when the device 605 is acting as the second UE the request acceptance component 625 may transmit, to the first UE, a second RRC message indicating an acceptance of the request to establish the unicast connection over the sidelink and a set of parameters of the second UE.

When the device 605 is acting as the second UE, the communications manager 615 may also include and use the unicast sidelink establishment component 630. However, when the device 605 is acting as the second UE the unicast sidelink establishment component 630 may establish the unicast connection over the sidelink with the first UE based on the acceptance of the request and the set of parameters of the second UE.

When the device 605 is acting as the second UE, the communications manager 615 may also include and use the unicast sidelink communications component 635. However, when the device 605 is acting as the second UE the unicast sidelink communications component 635 may transmit or receiving user data over the sidelink using the established unicast connection.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
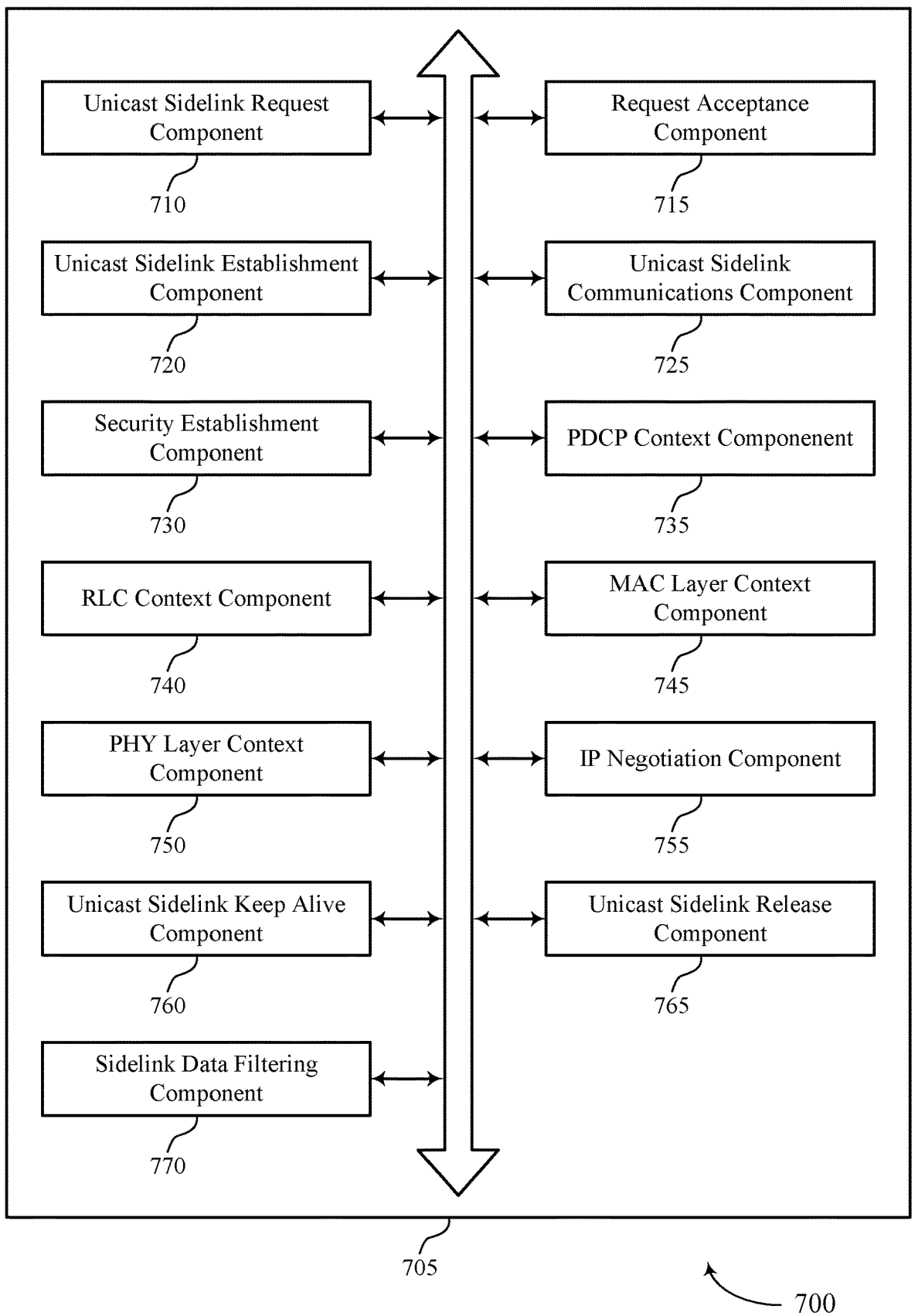
FIG. 7 shows a block diagram of a communications manager that supports unicast sidelink establishment in accordance with aspects of the present disclosure.

FIG. 7 shows a block diagram 700 of a communications manager 705 that supports unicast sidelink establishment in accordance with aspects of the present disclosure. The communications manager 705 may be an example of aspects of a communications manager 515, a communications manager 615, or a communications manager 810 described herein. The communications manager 705 may include various features, as described below, for a device, though only some features may be used when the device is acting as a first UE (e.g., initiating UE), while other features may be limited to use when the device is acting as a second UE (e.g., target UE). The communications manager 705 may include a unicast sidelink request component 710, a request acceptance component 715, a unicast sidelink establishment component 720, a unicast sidelink communications component 725, a security establishment component 730, a PDCP context component 735, an RLC context component 740, a MAC layer context component 745, a PHY layer context component 750, an IP negotiation component 755, a unicast sidelink keep alive component 760, a unicast sidelink release component 765, and a sidelink data filtering component 770. Each of these modules may communicate, directly or indirectly, with one another (e.g., via one or more buses).

When the device 605 is acting as the first UE, the communications manager 615 may include and use a unicast sidelink request component 710. The unicast sidelink request component 710 may transmit, to a second UE, a first RRC message including a request to establish a unicast connection over a sidelink between the first UE and the second UE. When the device 605 is acting as the second UE, the communications manager 615 may include and use a unicast sidelink request component 710. Accordingly, the unicast sidelink request component 710 may receive, from a first UE, a first RRC message including a request to establish a unicast connection over a sidelink between the first UE and the second UE. In some examples, the unicast sidelink request component 710 may receive an indication of a service offered by the second UE, where the first UE transmits the first RRC message based on the indication of the service.

When the device 605 is acting as the first UE, the communications manager 615 may include and use a request acceptance component 715. The request acceptance component 715 may receive, from the second UE, a second RRC message indicating an acceptance of the request to establish the unicast connection over the sidelink and a set of parameters of the second UE. When the device 605 is acting as the second UE, the communications manager 615 may include and use a request acceptance component 715. Accordingly, the request acceptance component 715 may transmit, to the first UE, a second RRC message indicating an acceptance of the request to establish the unicast connection over the sidelink and a set of parameters of the second UE.

In some cases, when the device 605 is acting as the second UE, the request acceptance component 715 may determine to accept the request of the first RRC message based on a transmission/reception capability, an amount of radio resources available for the unicast connection, an issue for scheduling the unicast connection, a particular service indicated for the unicast connection, or a combination thereof. Additionally, the first RRC message may include a first set of parameters of the first UE, the set of parameters of the second UE being based on the first set of parameters of the first UE. In some cases, the set of parameters includes a set of capabilities, connection parameters, or a combination thereof for the second UE.

When the device 605 is acting as the first UE, the communications manager 615 may include and use a unicast sidelink establishment component 720. The unicast sidelink establishment component 720 may establish the unicast connection over the sidelink with the second UE based on the acceptance of the request and the set of parameters of the second UE. Additionally, the unicast sidelink establishment component 720 may transmit, to the second UE, a third RRC message indicating that the unicast connection has been established.

When the device 605 is acting as the second UE, the communications manager 615 may include and use a unicast sidelink establishment component 720. Accordingly, the unicast sidelink establishment component 720 may establish the unicast connection over the sidelink with the first UE based on the acceptance of the request and the set of parameters of the second UE. Additionally, the unicast sidelink establishment component 720 may receive, from the first UE, a third RRC message indicating that the unicast connection has been established. In some cases, the first and second RRC messages may be carried by one or more sidelink signaling radio bearers.

When the device 605 is acting as the first UE or the second UE, the communications manager 615 may include and use a unicast sidelink communications component 725. The unicast sidelink communications component 725 may transmit or receive user data over the sidelink using the established unicast connection.

When the device 605 is acting as the first UE or the second UE, the communications manager 615 may include and use a security establishment component 730. The security establishment component 730 may establish a security context for the unicast connection based on the set of parameters of the second UE.

When the device 605 is acting as the first UE or the second UE, the communications manager 615 may include and use a PDCP context component 735. The PDCP context component 735 may set a PDCP context of the unicast connection based on one or more PDCP parameters of the first UE and/or the second UE indicated in the first RRC message or the second RRC message, respectively.

When the device 605 is acting as the first UE or the second UE, the communications manager 615 may include and use an RLC context component 740. The RLC context component 740 may set an RLC context of the unicast connection based on one or more RLC parameters of the first UE and/or the second UE indicated in the first RRC message or the second RRC message, respectively. In some cases, the one or more RLC parameters may include an indication of whether an AM or a UM is supported by the first UE or the second UE.

When the device 605 is acting as the first UE or the second UE, the communications manager 615 may include and use a MAC layer context component 745. The MAC layer context component 745 may set a MAC context of the unicast connection based on one or more MAC layer parameters of the first UE and/or the second UE indicated in the first RRC message or the second RRC message, respectively. In some cases, the one or more MAC layer parameters may include an indication of a resource selection algorithm for the first UE or the second UE, an ACK parameter for the first UE or the second UE, or a CA parameter for the first UE or the second UE.

When the device 605 is acting as the first UE or the second UE, the communications manager 615 may include and use a PHY layer context component 750. The PHY layer context component 750 may set a PHY layer context of the unicast connection based on one or more PHY layer parameters of the first UE and/or the second UE indicated in the first RRC message or the second RRC message, respectively. In some cases, the one or more PHY layer parameters may include a transmit format for the unicast connection, a radio resource configuration for the unicast connection, or a supported band for the unicast connection.

When the device 605 is acting as the first UE or the second UE, the communications manager 615 may include and use an IP negotiation component 755. The IP negotiation component 755 may negotiate internet protocol layer parameters for the unicast connection with the second UE (e.g., and/or the first UE) via upper layer messaging carried in the first RRC message or the second RRC message.

When the device 605 is acting as the first UE or the second UE, the communications manager 615 may include and use a unicast sidelink keep alive component 760. The unicast sidelink keep alive component 760 may transmit a keep alive message to the second UE (e.g., and/or to the first UE) for the unicast connection. In some cases, the keep alive message is transmitted periodically. Additionally or alternatively, the keep alive message is transmitted on-demand in response to a trigger. In some cases, the keep alive message may be a fourth RRC message or a MAC CE message.

When the device 605 is acting as the first UE or the second UE, the communications manager 615 may include and use a unicast sidelink release component 765. The unicast sidelink release component 765 may initiate a release procedure to end the unicast connection with the second UE (e.g., and/or with the first UE).

When the device 605 is acting as the first UE or the second UE, the communications manager 615 may include and use a sidelink data filtering component 770. The sidelink data filtering component 770 may set up a bearer for the unicast connection. Additionally, the sidelink data filtering component 770 may filter data to and from the bearer based on a L2 ID of the first UE, a L2 ID of the second UE, and a QoS profile of the unicast connection. In some cases, the filtering may occur at a V2X layer.

Figure 8:
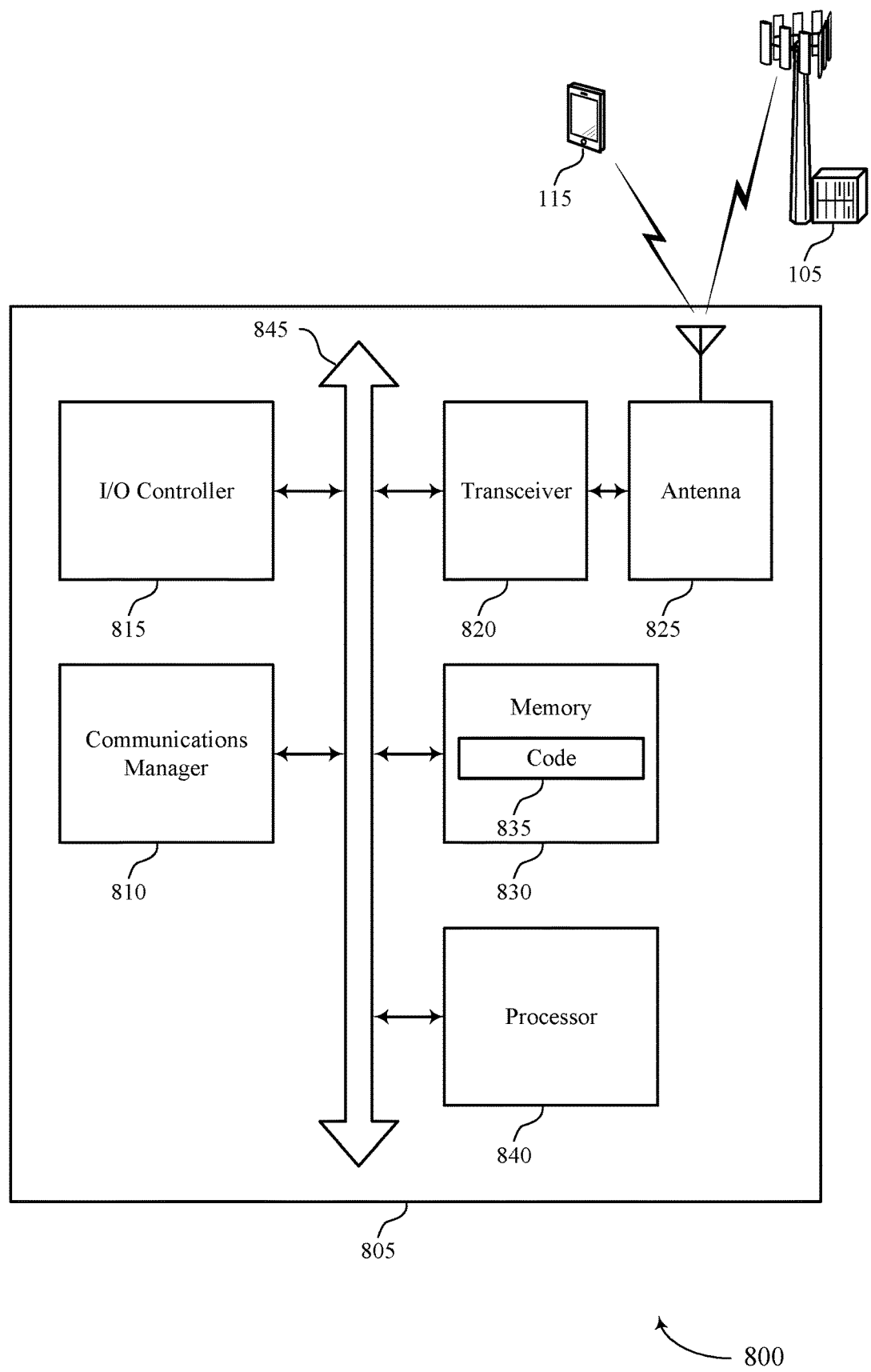
FIG. 8 shows a diagram of a system including a device that supports unicast sidelink establishment in accordance with aspects of the present disclosure.

FIG. 8 shows a diagram of a system 800 including a device 805 that supports unicast sidelink establishment in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

When device 805 is acting as a first UE (e.g., initiating UE), the communications manager 810 may transmit, to a second UE, a first RRC message including a request to establish a unicast connection over a sidelink between the first UE and the second UE. In some cases, the communications manager 810 may receive, from the second UE, a second RRC message indicating an acceptance of the request to establish the unicast connection over the sidelink and a set of parameters of the second UE. The communications manager 810 may then establish the unicast connection over the sidelink with the second UE based on the acceptance of the request and the set of parameters of the second UE. Accordingly, the communications manager 810 may transmit or receiving user data over the sidelink using the established unicast connection.

Additionally or alternatively, when device 805 is acting as a second UE (e.g., target UE), the communications manager 810 may receive, from a first UE, a first RRC message including a request to establish a unicast connection over a sidelink between the first UE and the second UE. In some cases, the communications manager 810 may transmit, to the first UE, a second RRC message indicating an acceptance of the request to establish the unicast connection over the sidelink and a set of parameters of the second UE. The communications manager 810 may then establish the unicast connection over the sidelink with the first UE based on the acceptance of the request and the set of parameters of the second UE. Accordingly, the communications manager 810 may transmit or receiving user data over the sidelink using the established unicast connection.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting unicast sidelink establishment).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
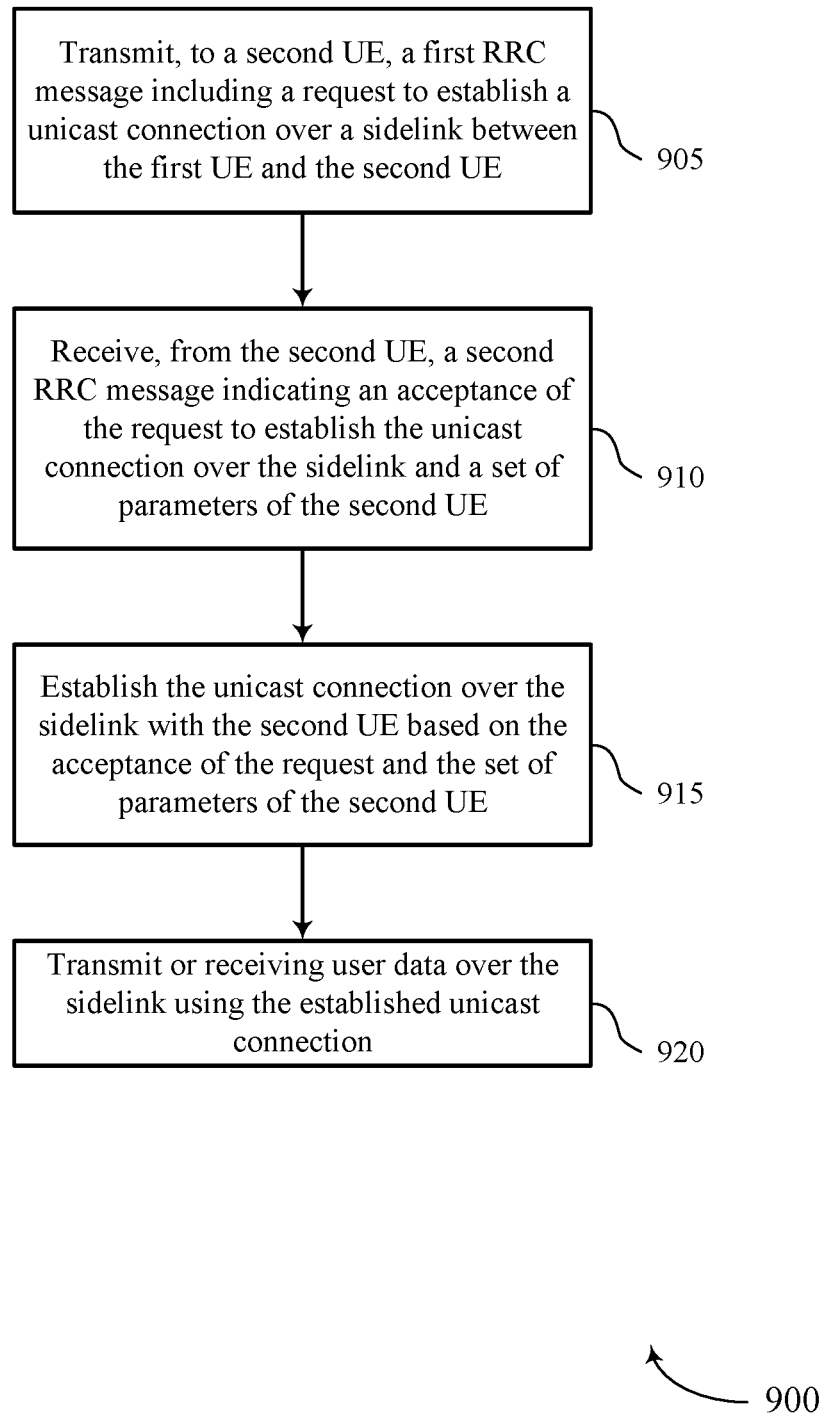
FIGS. 9 through 14 show flowcharts illustrating methods that support unicast sidelink establishment in accordance with aspects of the present disclosure.

FIG. 9 shows a flowchart illustrating a method 900 that supports unicast sidelink establishment in accordance with aspects of the present disclosure. The operations of method 900 may be implemented by a UE 115 or its components as described herein. For example, the operations of method 900 may be performed by a communications manager as described with reference to FIGS. 5 through 8, where the communications manager is part of a first UE (e.g., an initiating UE). In some examples, a UE may execute a set of instructions to control the functional elements of the UE to perform the functions described below. Additionally or alternatively, a UE may perform aspects of the functions described below using special-purpose hardware.

At 905, the first UE may transmit, to a second UE, a first RRC message including a request to establish a unicast connection over a sidelink between the first UE and the second UE. The operations of 905 may be performed according to the methods described herein. In some examples, aspects of the operations of 905 may be performed by a unicast sidelink request component as described with reference to FIGS. 5 through 8.

At 910, the first UE may receive, from the second UE, a second RRC message indicating an acceptance of the request to establish the unicast connection over the sidelink and a set of parameters of the second UE. The operations of 910 may be performed according to the methods described herein. In some examples, aspects of the operations of 910 may be performed by a request acceptance component as described with reference to FIGS. 5 through 8.

At 915, the first UE may establish the unicast connection over the sidelink with the second UE based on the acceptance of the request and the set of parameters of the second UE. The operations of 915 may be performed according to the methods described herein. In some examples, aspects of the operations of 915 may be performed by a unicast sidelink establishment component as described with reference to FIGS. 5 through 8.

At 920, the first UE may transmit or receiving user data over the sidelink using the established unicast connection. The operations of 920 may be performed according to the methods described herein. In some examples, aspects of the operations of 920 may be performed by a unicast sidelink communications component as described with reference to FIGS. 5 through 8.

Figure 10:
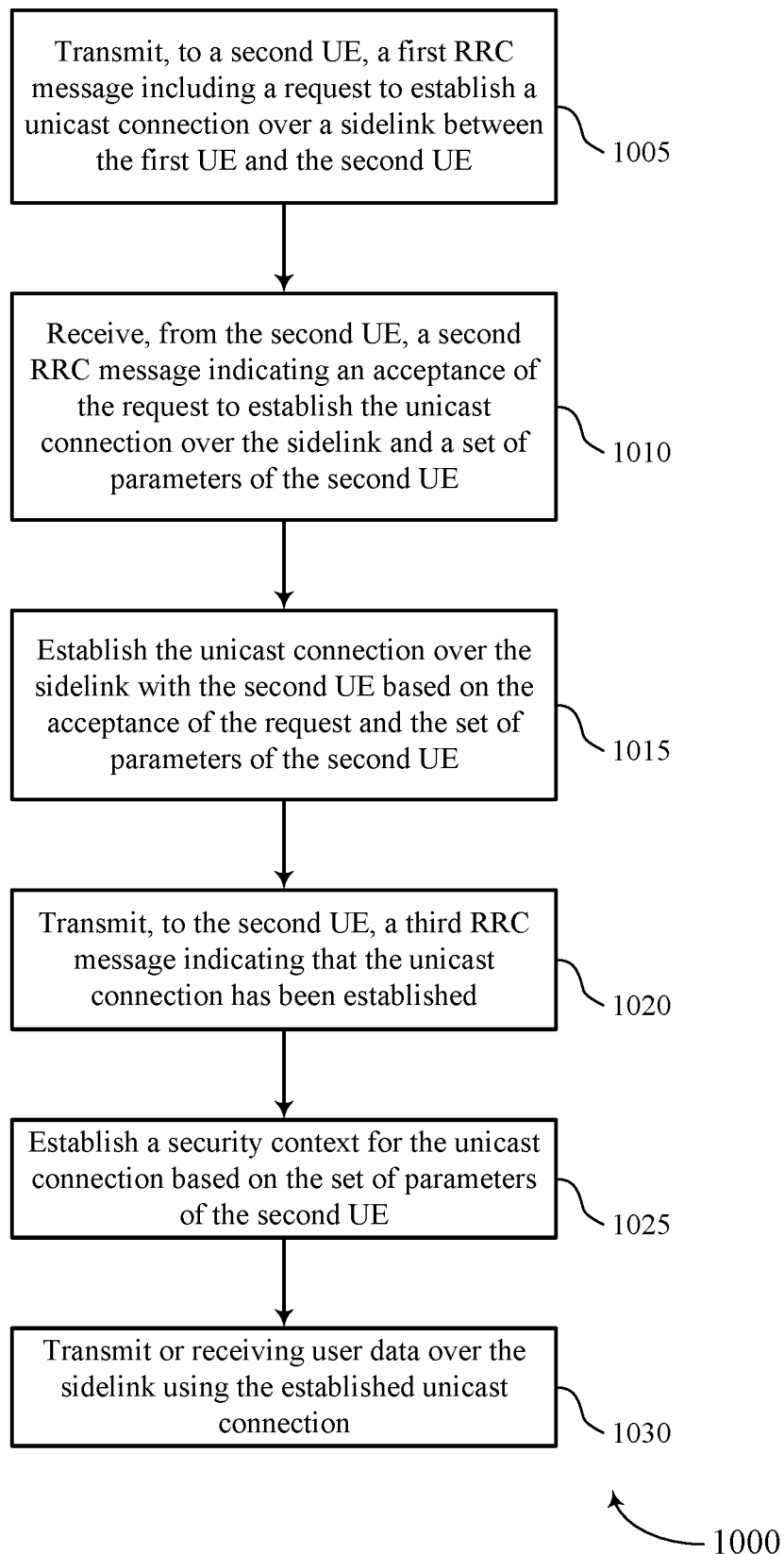

FIG. 10 shows a flowchart illustrating a method 1000 that supports unicast sidelink establishment in accordance with aspects of the present disclosure. The operations of method 1000 may be implemented by a UE 115 or its components as described herein. For example, the operations of method 1000 may be performed by a communications manager as described with reference to FIGS. 5 through 8, where the communications manager is part of a first UE (e.g., an initiating UE). In some examples, a UE may execute a set of instructions to control the functional elements of the UE to perform the functions described below. Additionally or alternatively, a UE may perform aspects of the functions described below using special-purpose hardware.

At 1005, the first UE may transmit, to a second UE, a first RRC message including a request to establish a unicast connection over a sidelink between the first UE and the second UE. The operations of 1005 may be performed according to the methods described herein. In some examples, aspects of the operations of 1005 may be performed by a unicast sidelink request component as described with reference to FIGS. 5 through 8.

At 1010, the first UE may receive, from the second UE, a second RRC message indicating an acceptance of the request to establish the unicast connection over the sidelink and a set of parameters of the second UE. The operations of 1010 may be performed according to the methods described herein. In some examples, aspects of the operations of 1010 may be performed by a request acceptance component as described with reference to FIGS. 5 through 8.

At 1015, the first UE may establish the unicast connection over the sidelink with the second UE based on the acceptance of the request and the set of parameters of the second UE. The operations of 1015 may be performed according to the methods described herein. In some examples, aspects of the operations of 1015 may be performed by a unicast sidelink establishment component as described with reference to FIGS. 5 through 8.

At 1020, the first UE may transmit, to the second UE, a third RRC message indicating that the unicast connection has been established. The operations of 1020 may be performed according to the methods described herein. In some examples, aspects of the operations of 1020 may be performed by a unicast sidelink establishment component as described with reference to FIGS. 5 through 8.

At 1025, the first UE may establish a security context for the unicast connection based on the set of parameters of the second UE. The operations of 1025 may be performed according to the methods described herein. In some examples, aspects of the operations of 1025 may be performed by a security establishment component as described with reference to FIGS. 5 through 8.

At 1030, the first UE may transmit or receiving user data over the sidelink using the established unicast connection. The operations of 1030 may be performed according to the methods described herein. In some examples, aspects of the operations of 1030 may be performed by a unicast sidelink communications component as described with reference to FIGS. 5 through 8.

Figure 11:
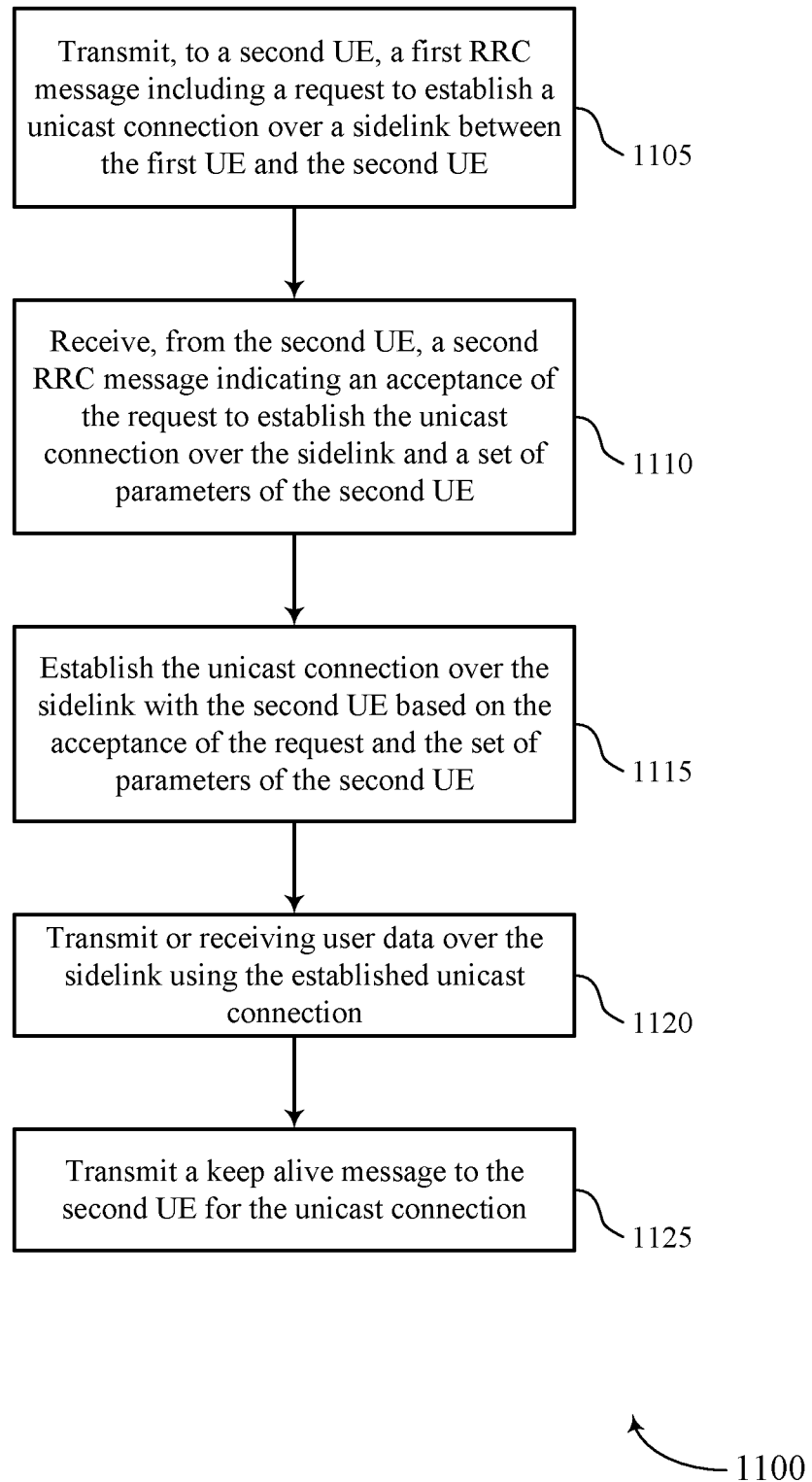

FIG. 11 shows a flowchart illustrating a method 1100 that supports unicast sidelink establishment in accordance with aspects of the present disclosure. The operations of method 1100 may be implemented by a UE 115 or its components as described herein. For example, the operations of method 1100 may be performed by a communications manager as described with reference to FIGS. 5 through 8, where the communications manager is part of a first UE (e.g., an initiating UE). In some examples, a UE may execute a set of instructions to control the functional elements of the UE to perform the functions described below. Additionally or alternatively, a UE may perform aspects of the functions described below using special-purpose hardware.

At 1105, the first UE may transmit, to a second UE, a first RRC message including a request to establish a unicast connection over a sidelink between the first UE and the second UE. The operations of 1105 may be performed according to the methods described herein. In some examples, aspects of the operations of 1105 may be performed by a unicast sidelink request component as described with reference to FIGS. 5 through 8.

At 1110, the first UE may receive, from the second UE, a second RRC message indicating an acceptance of the request to establish the unicast connection over the sidelink and a set of parameters of the second UE. The operations of 1110 may be performed according to the methods described herein. In some examples, aspects of the operations of 1110 may be performed by a request acceptance component as described with reference to FIGS. 5 through 8.

At 1115, the first UE may establish the unicast connection over the sidelink with the second UE based on the acceptance of the request and the set of parameters of the second UE. The operations of 1115 may be performed according to the methods described herein. In some examples, aspects of the operations of 1115 may be performed by a unicast sidelink establishment component as described with reference to FIGS. 5 through 8.

At 1120, the first UE may transmit or receiving user data over the sidelink using the established unicast connection. The operations of 1120 may be performed according to the methods described herein. In some examples, aspects of the operations of 1120 may be performed by a unicast sidelink communications component as described with reference to FIGS. 5 through 8.

At 1125, the first UE may transmit a keep alive message to the second UE for the unicast connection. The operations of 1125 may be performed according to the methods described herein. In some examples, aspects of the operations of 1125 may be performed by a unicast sidelink keep alive component as described with reference to FIGS. 5 through 8.

Figure 12:
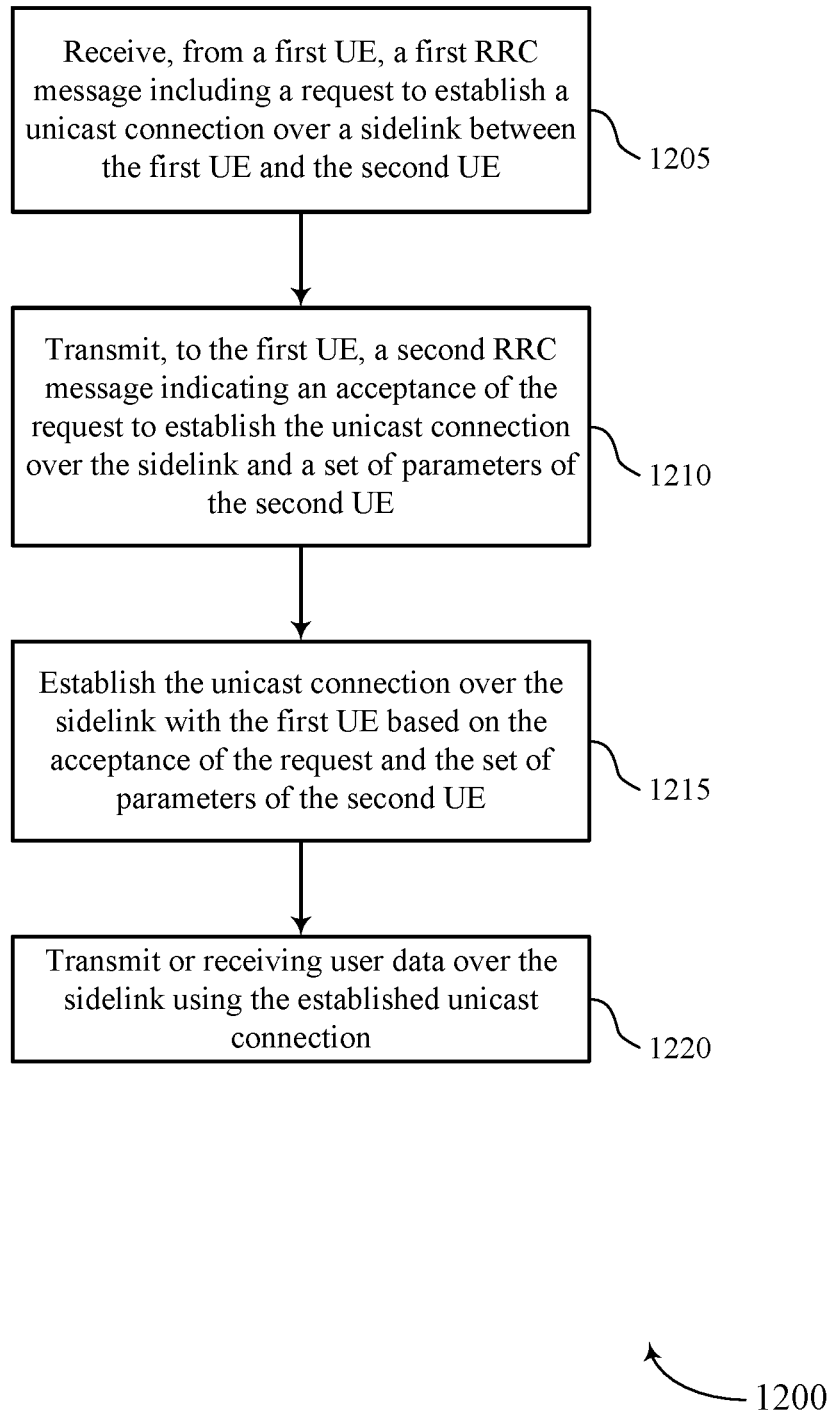

FIG. 12 shows a flowchart illustrating a method 1200 that supports unicast sidelink establishment in accordance with aspects of the present disclosure. The operations of method 1200 may be implemented by a UE 115 or its components as described herein. For example, the operations of method 1200 may be performed by a communications manager as described with reference to FIGS. 5 through 8, where the communications manager is part of a second UE (e.g., a target UE). In some examples, a UE may execute a set of instructions to control the functional elements of the UE to perform the functions described below. Additionally or alternatively, a UE may perform aspects of the functions described below using special-purpose hardware.

At 1205, the second UE may receive, from a first UE, a first RRC message including a request to establish a unicast connection over a sidelink between the first UE and the second UE. The operations of 1205 may be performed according to the methods described herein. In some examples, aspects of the operations of 1205 may be performed by a unicast sidelink request component as described with reference to FIGS. 5 through 8.

At 1210, the second UE may transmit, to the first UE, a second RRC message indicating an acceptance of the request to establish the unicast connection over the sidelink and a set of parameters of the second UE. The operations of 1210 may be performed according to the methods described herein. In some examples, aspects of the operations of 1210 may be performed by a request acceptance component as described with reference to FIGS. 5 through 8.

At 1215, the second UE may establish the unicast connection over the sidelink with the first UE based on the acceptance of the request and the set of parameters of the second UE. The operations of 1215 may be performed according to the methods described herein. In some examples, aspects of the operations of 1215 may be performed by a unicast sidelink establishment component as described with reference to FIGS. 5 through 8.

At 1220, the second UE may transmit or receiving user data over the sidelink using the established unicast connection. The operations of 1220 may be performed according to the methods described herein. In some examples, aspects of the operations of 1220 may be performed by a unicast sidelink communications component as described with reference to FIGS. 5 through 8.

Figure 13:
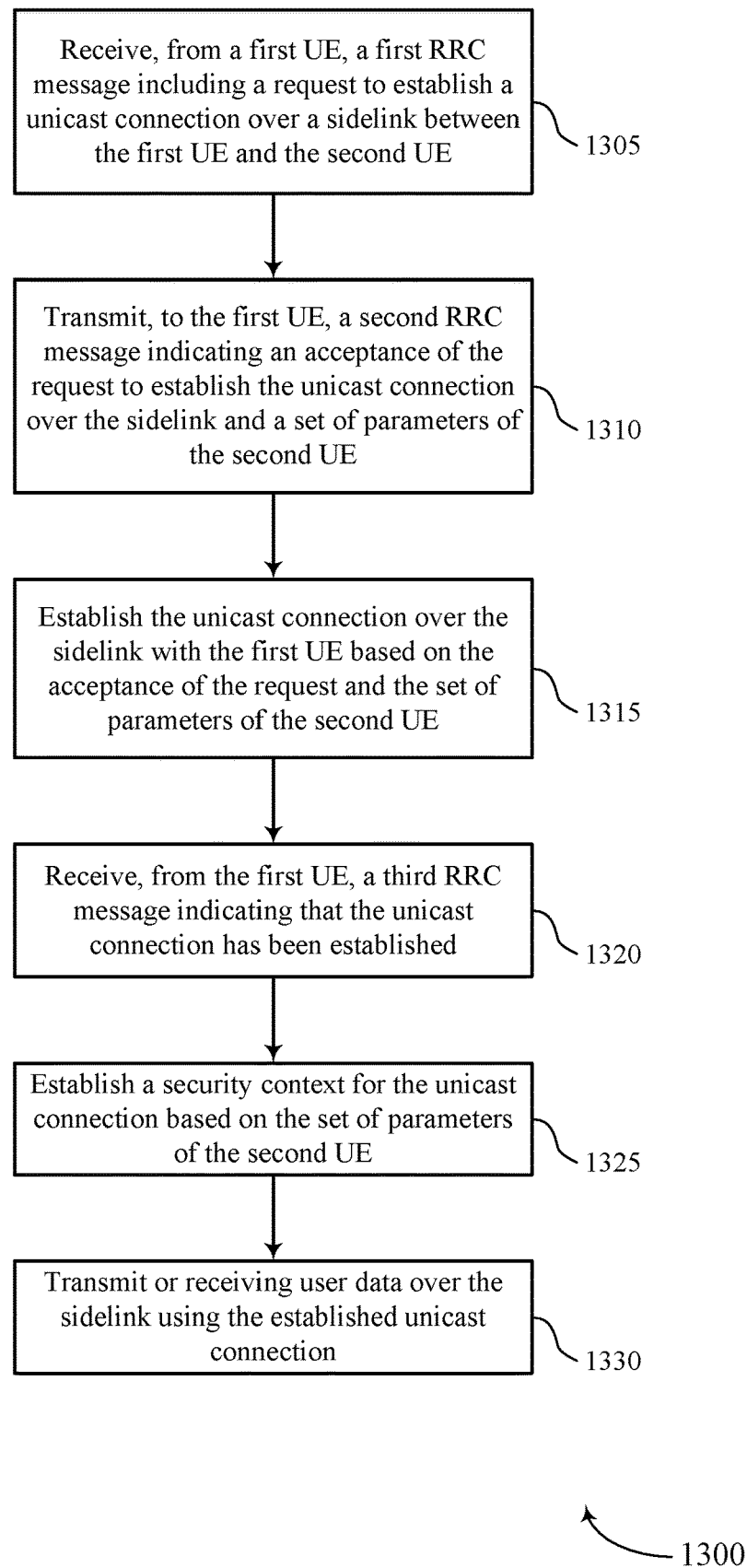

FIG. 13 shows a flowchart illustrating a method 1300 that supports unicast sidelink establishment in accordance with aspects of the present disclosure. The operations of method 1300 may be implemented by a UE 115 or its components as described herein. For example, the operations of method 1300 may be performed by a communications manager as described with reference to FIGS. 5 through 8, where the communications manager is part of a second UE (e.g., a target UE). In some examples, a UE may execute a set of instructions to control the functional elements of the UE to perform the functions described below. Additionally or alternatively, a UE may perform aspects of the functions described below using special-purpose hardware.

At 1305, the second UE may receive, from a first UE, a first RRC message including a request to establish a unicast connection over a sidelink between the first UE and the second UE. The operations of 1305 may be performed according to the methods described herein. In some examples, aspects of the operations of 1305 may be performed by a unicast sidelink request component as described with reference to FIGS. 5 through 8.

At 1310, the second UE may transmit, to the first UE, a second RRC message indicating an acceptance of the request to establish the unicast connection over the sidelink and a set of parameters of the second UE. The operations of 1310 may be performed according to the methods described herein. In some examples, aspects of the operations of 1310 may be performed by a request acceptance component as described with reference to FIGS. 5 through 8.

At 1315, the second UE may establish the unicast connection over the sidelink with the first UE based on the acceptance of the request and the set of parameters of the second UE. The operations of 1315 may be performed according to the methods described herein. In some examples, aspects of the operations of 1315 may be performed by a unicast sidelink establishment component as described with reference to FIGS. 5 through 8.

At 1320, the second UE may receive, from the first UE, a third RRC message indicating that the unicast connection has been established. The operations of 1320 may be performed according to the methods described herein. In some examples, aspects of the operations of 1320 may be performed by a unicast sidelink establishment component as described with reference to FIGS. 5 through 8.

At 1325, the second UE may establish a security context for the unicast connection based on the set of parameters of the second UE. The operations of 1325 may be performed according to the methods described herein. In some examples, aspects of the operations of 1325 may be performed by a security establishment component as described with reference to FIGS. 5 through 8.

At 1330, the second UE may transmit or receiving user data over the sidelink using the established unicast connection. The operations of 1330 may be performed according to the methods described herein. In some examples, aspects of the operations of 1330 may be performed by a unicast sidelink communications component as described with reference to FIGS. 5 through 8.

Figure 14:
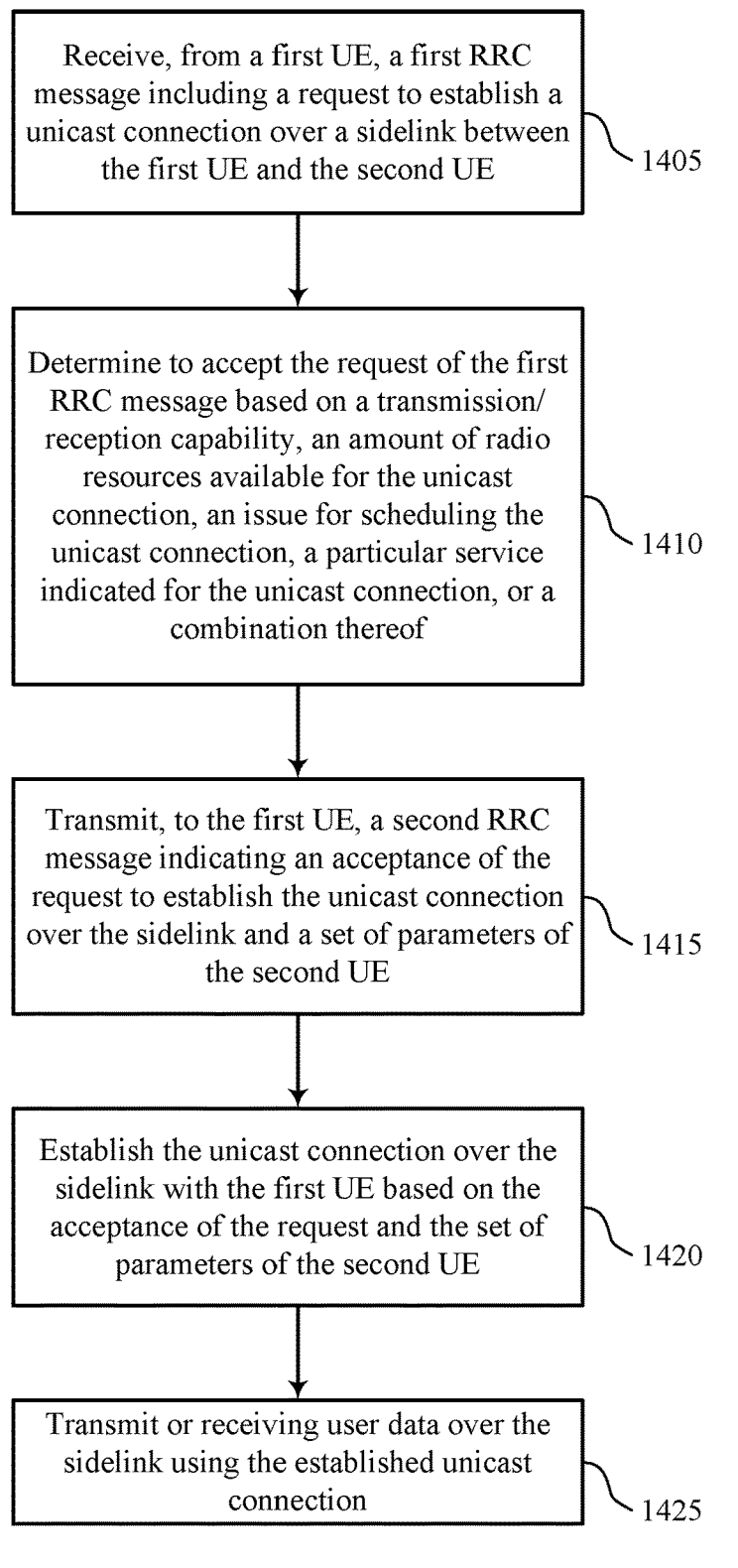

FIG. 14 shows a flowchart illustrating a method 1400 that supports unicast sidelink establishment in accordance with aspects of the present disclosure. The operations of method 1400 may be implemented by a UE 115 or its components as described herein. For example, the operations of method 1400 may be performed by a communications manager as described with reference to FIGS. 5 through 8, where the communications manager is part of a second UE (e.g., a target UE). In some examples, a UE may execute a set of instructions to control the functional elements of the UE to perform the functions described below. Additionally or alternatively, a UE may perform aspects of the functions described below using special-purpose hardware.

At 1405, the second UE may receive, from a first UE, a first RRC message including a request to establish a unicast connection over a sidelink between the first UE and the second UE. The operations of 1405 may be performed according to the methods described herein. In some examples, aspects of the operations of 1405 may be performed by a unicast sidelink request component as described with reference to FIGS. 5 through 8.

At 1410, the second UE may determine to accept the request of the first RRC message based on a transmission/reception capability, an amount of radio resources available for the unicast connection, an issue for scheduling the unicast connection, a particular service indicated for the unicast connection, or a combination thereof. The operations of 1410 may be performed according to the methods described herein. In some examples, aspects of the operations of 1410 may be performed by a unicast sidelink request component as described with reference to FIGS. 5 through 8.

At 1415, the second UE may transmit, to the first UE, a second RRC message indicating an acceptance of the request to establish the unicast connection over the sidelink and a set of parameters of the second UE. The operations of 1415 may be performed according to the methods described herein. In some examples, aspects of the operations of 1415 may be performed by a request acceptance component as described with reference to FIGS. 5 through 8.

At 1420, the second UE may establish the unicast connection over the sidelink with the first UE based on the acceptance of the request and the set of parameters of the second UE. The operations of 1420 may be performed according to the methods described herein. In some examples, aspects of the operations of 1420 may be performed by a unicast sidelink establishment component as described with reference to FIGS. 5 through 8.

At 1425, the second UE may transmit or receiving user data over the sidelink using the established unicast connection. The operations of 1425 may be performed according to the methods described herein. In some examples, aspects of the operations of 1425 may be performed by a unicast sidelink communications component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the UEs may have similar frame timing, and transmissions from different UEs may be approximately aligned in time. For asynchronous operation, the UEs may have different frame timing, and transmissions from different UEs may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
   transmitting, to a second UE, a first radio resource control (RRC) message comprising a request to establish a unicast connection over a sidelink between the first UE and the second UE;
   receiving, from the second UE, a second RRC message indicating an acceptance of the request to establish the unicast connection over the sidelink and a set of parameters of the second UE;
   establishing the unicast connection over the sidelink with the second UE based at least in part on the acceptance of the request and the set of parameters of the second UE; and
   transmitting or receiving user data over the sidelink using the established unicast connection.

2. The method of claim 1, wherein establishing the unicast connection over the sidelink with the second UE further comprises:
   transmitting, to the second UE, a third RRC message indicating that the unicast connection has been established.

3. The method of claim 1, wherein establishing the unicast connection comprises:
   establishing a security context for the unicast connection based at least in part on the set of parameters of the second UE.

4. The method of claim 1, wherein one or more of the first RRC message or the second RRC message comprises one or more packet data convergence protocol (PDCP) parameters, and wherein establishing the unicast connection over the sidelink with the second UE comprises:
   setting a PDCP context of the unicast connection based at least in part on the one or more PDCP parameters.

5. The method of claim 1, wherein one or more of the first RRC message or the second RRC message comprises one or more radio link control (RLC) parameters, and wherein establishing the unicast connection over the sidelink with the second UE comprises:
   setting an RLC context of the unicast connection based at least in part on the one or more RLC parameters.

6. The method of claim 5, wherein the one or more RLC parameters comprise an indication of whether an acknowledged mode or an unacknowledged mode is supported by the first UE or the second UE.

7. The method of claim 1, wherein one or more of the first RRC message or the second RRC message comprises one or more medium access control (MAC) layer parameters, and wherein establishing the unicast connection over the sidelink with the second UE comprises:
   setting a MAC context of the unicast connection based at least in part on the one or more MAC layer parameters.

8. The method of claim 7, wherein the one or more MAC layer parameters comprise one or more of: an indication of a resource selection algorithm for the first UE or the second UE, an acknowledgment parameter for the first UE or the second UE, or a carrier aggregation parameter for the first UE or the second UE.

9. The method of claim 1, wherein one or more of the first RRC message or the second RRC message comprises one or more physical layer parameters, and wherein establishing the unicast connection over the sidelink with the second UE comprises:
   setting a physical layer context of the unicast connection based at least in part on the one or more physical layer parameters.

10. The method of claim 9, wherein the one or more physical layer parameters comprise one or more of: a transmit format for the unicast connection, a radio resource configuration for the unicast connection, or a supported band for the unicast connection.

11. The method of claim 1, further comprising:
    transmitting a keep alive message to the second UE for the unicast connection.

12. The method of claim 11, wherein the keep alive message is transmitted periodically.

13. The method of claim 11, wherein the keep alive message is transmitted on-demand in response to a trigger.

14. The method of claim 11, wherein the keep alive message is one or more of: a fourth RRC message or a MAC control element (MAC CE) message.

15. The method of claim 1, further comprising:
    initiating a release procedure to end the unicast connection with the second UE.

16. The method of claim 1, wherein establishing the unicast connection over the sidelink with the second UE comprises:
    setting up a bearer for the unicast connection; and
    filtering data to and from the bearer based at least in part on a layer 2 identifier of the first UE, a layer 2 identifier of the second UE, and a quality of service (QoS) profile of the unicast connection.

17. The method of claim 16, wherein the filtering occurs at a vehicle-to-anything (V2X) layer.

18. The method of claim 1, wherein the first and second RRC messages are carried by one or more sidelink signaling radio bearers.

19. The method of claim 1, further comprising:
    receiving an indication of a service offered by the second UE; and
    wherein the first UE transmits the first RRC message based at least in part on the indication of the service.

20. The method of claim 1, wherein the set of parameters comprises a set of capabilities, connection parameters, or a combination thereof for the second UE.

21. The method of claim 1, wherein the first RRC message comprises a first set of parameters of the first UE, the set of parameters of the second UE being based at least in part on the first set of parameters of the first UE.

22. An apparatus for wireless communications at a first user equipment (UE), comprising: a processor, memory in electronic communication with the processor; and instructions stored in the memory and executable by the processor to cause the apparatus to:
    transmit, to a second UE, a first radio resource control (RRC) message comprising a request to establish a unicast connection over a sidelink between the first UE and the second UE;
    receive, from the second UE, a second RRC message indicating an acceptance of the request to establish the unicast connection over the sidelink and a set of parameters of the second UE;
    establish the unicast connection over the sidelink with the second UE based at least in part on the acceptance of the request and the set of parameters of the second UE; and
    transmit or receiving user data over the sidelink using the established unicast connection.

23. The apparatus of claim 22, wherein the instructions to establish the unicast connection over the sidelink with the second UE further are executable by the processor to cause the apparatus to:

transmit, to the second UE, a third RRC message indicating that the unicast connection has been established.

24. The apparatus of claim 22, wherein the instructions to establish the unicast connection are executable by the processor to cause the apparatus to:
   establish a security context for the unicast connection based at least in part on the set of parameters of the second UE.

25. The apparatus of claim 22, wherein one or more of the first RRC message or the second RRC message comprises one or more packet data convergence protocol (PDCP) parameters, and wherein the instructions to establish the unicast connection over the sidelink with the second UE are further executable by the processor to cause the apparatus to:
   set a PDCP context of the unicast connection based at least in part on the one or more PDCP parameters.

26. The apparatus of claim 22, wherein one or more of the first RRC message or the second RRC message comprises one or more radio link control (RLC) parameters, and wherein the instructions to establish the unicast connection over the sidelink with the second UE are further executable by the processor to cause the apparatus to:
   set an RLC context of the unicast connection based at least in part on the one or more RLC parameters.

27. The apparatus of claim 22, wherein one or more of the first RRC message or the second RRC message comprises one or more medium access control (MAC) layer parameters, and wherein the instructions to establish the unicast connection over the sidelink with the second UE are further executable by the processor to cause the apparatus to:
   set a MAC context of the unicast connection based at least in part on the one or more MAC layer parameters.

28. The apparatus of claim 22, wherein one or more of the first RRC message or the second RRC message comprises one or more physical layer parameters, and wherein the instructions to establish the unicast connection over the sidelink with the second UE are further executable by the processor to cause the apparatus to:
   set a physical layer context of the unicast connection based at least in part on the one or more physical layer parameters.

29. An apparatus for wireless communications at a first user equipment (UE), comprising:
   means for transmitting, to a second UE, a first radio resource control (RRC) message comprising a request to establish a unicast connection over a sidelink between the first UE and the second UE;
   means for receiving, from the second UE, a second RRC message indicating an acceptance of the request to establish the unicast connection over the sidelink and a set of parameters of the second UE;
   means for establishing the unicast connection over the sidelink with the second UE based at least in part on the acceptance of the request and the set of parameters of the second UE; and
   means for transmitting or receiving user data over the sidelink using the established unicast connection.

30. A non-transitory computer-readable medium storing code for wireless communications at a first user equipment (UE), the code comprising instructions executable by a processor to:
   transmit, to a second UE, a first radio resource control (RRC) message comprising a request to establish a unicast connection over a sidelink between the first UE and the second UE;
   receive, from the second UE, a second RRC message indicating an acceptance of the request to establish the unicast connection over the sidelink and a set of parameters of the second UE;
   establish the unicast connection over the sidelink with the second UE based at least in part on the acceptance of the request and the set of parameters of the second UE; and
   transmit or receiving user data over the sidelink using the established unicast connection.

* * * * *